United States Patent
Coban et al.

(10) Patent No.: US 9,641,846 B2
(45) Date of Patent: May 2, 2017

(54) ADAPTIVE SCANNING OF TRANSFORM COEFFICIENTS FOR VIDEO CODING

(75) Inventors: Muhammed Zeyd Coban, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 158 days.

(21) Appl. No.: 13/275,128

(22) Filed: Oct. 17, 2011

(65) Prior Publication Data

US 2012/0099646 A1  Apr. 26, 2012

Related U.S. Application Data

(60) Provisional application No. 61/406,039, filed on Oct. 22, 2010.

(51) Int. Cl.
| | |
|---|---|
| *H04N 7/26* | (2006.01) |
| *H04N 19/14* | (2014.01) |
| *H04N 19/176* | (2014.01) |
| *H04N 19/70* | (2014.01) |
| *H04N 19/46* | (2014.01) |
| *H04N 19/129* | (2014.01) |

(52) U.S. Cl.
CPC ........... *H04N 19/14* (2014.11); *H04N 19/129* (2014.11); *H04N 19/176* (2014.11); *H04N 19/46* (2014.11); *H04N 19/70* (2014.11)

(58) Field of Classification Search
CPC .............................. H04N 19/14; H04N 19/129
USPC ............................................. 375/240–240.29
See application file for complete search history.

(56) References Cited

U.S. PATENT DOCUMENTS

| | | | |
|---|---|---|---|
| 5,086,488 A | * | 2/1992 | Kato et al. .................... 382/239 |
| 5,500,678 A | | 3/1996 | Puri |
| 5,748,791 A | | 5/1998 | Park |

(Continued)

FOREIGN PATENT DOCUMENTS

| | | | |
|---|---|---|---|
| EP | 2182732 A1 | * | 5/2010 |
| EP | 2182732 A1 | | 5/2010 |

(Continued)

OTHER PUBLICATIONS

Yoo, et al., "Adaptive Scan Pattern for Quantized Coefficients in Intra Coding of H.264," IEICE Trans. Inf. & Syst., vol. E92-D, No. 4, Apr. 2009, pp. 750-752.

(Continued)

*Primary Examiner* — Christopher S Kelley
*Assistant Examiner* — Jonathan Messmore
(74) *Attorney, Agent, or Firm* — Shumaker & Sieffert, P.A.

(57) ABSTRACT

In an example, an apparatus for decoding video data includes a video decoder that is configured to determine a number of transform coefficients associated with a block of video data, and to determine whether the number of transform coefficients exceeds a predetermined threshold. The video decoder is also configured to identify a scan order when the number of transform coefficients exceeds the predetermined threshold, wherein the scan order indicates an order in which the transform coefficients have been serialized from a two-dimensional array to a one-dimensional array, and to apply the scan order to inverse scan the number of transform coefficients associated with a block of video data.

58 Claims, 10 Drawing Sheets

(56) References Cited

U.S. PATENT DOCUMENTS

| | | | |
|---|---|---|---|
| 6,771,703 | B1 | 8/2004 | Oguz |
| 2003/0128887 | A1 | 7/2003 | Hatabu |
| 2004/0066974 | A1 | 4/2004 | Karczewicz |
| 2005/0078754 | A1 | 4/2005 | Liang et al. |
| 2005/0111547 | A1 | 5/2005 | Holcomb et al. |
| 2006/0146936 | A1 | 7/2006 | Srinivasan |
| 2008/0310504 | A1 | 12/2008 | Ye et al. |
| 2008/0310745 | A1 | 12/2008 | Ye et al. |
| 2009/0232204 | A1* | 9/2009 | Lee et al. ............... 375/240.02 |
| 2009/0273706 | A1* | 11/2009 | Tu et al. ................. 348/420.1 |
| 2010/0092099 | A1 | 4/2010 | Richter |
| 2010/0124284 | A1 | 5/2010 | Lee et al. |
| 2011/0001643 | A1* | 1/2011 | Sze et al. ..................... 341/87 |

FOREIGN PATENT DOCUMENTS

| | | |
|---|---|---|
| JP | H04247770 A | 9/1992 |
| JP | 2004193752 A | 7/2004 |
| JP | 2005354169 A | 12/2005 |
| JP | 2007129612 A | 5/2007 |
| JP | 2007201526 A | 8/2007 |
| WO | 2009134575 A2 | 11/2009 |
| WO | 2010042753 A1 | 4/2010 |

OTHER PUBLICATIONS

Davies et al., "Suggestion for a Test Model", 1. JCT-VC Meeting, Apr. 15, 2010-Apr. 23, 2010, Dresden, (Jointcollaborative Team on Video Coding of ISO/IEC JTCI/SC29/WGII and ITU-TSG.16), pp. 30, May 7, 2010 (May 7, 2010), XP030007526.

International Search Report and Written Opinion—PCT/US2011/057219—ISA/EPO—Jan. 25, 2012.

Marpe: "Proposed Cleanup Changes for CABAC", 5. JVT Meeting; Oct. 14, 2002-Oct. 18, 2002; Geneva, CH; (Joint Video Teamof ISO/IEC JTC1/SC29/WG11 and ITU-T SG.16), No. JVT-E059, Oct. 18, 2002 (Oct. 18, 2002), XP030005476, ISSN: 0000-0432 point 2.1.

Karczewicz, et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] Apr. 15-23 2010, pp. 1-24.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2011/057219, The International Bureau of WIPO—Geneva, Switzerland, Jan. 30, 2013, 23 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27- May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Reply to Written Opinion dated Jan. 25, 2012, from international application No. PCT/US2011/057219, filed Aug. 21, 2012, 26 pp.

Second Written Opinion from international application No. PCT/US2011/057219, dated Oct. 2, 2012, 4 pp.

Sze, V., et al., "A high throughput CABAC algorithm using syntax element partitioning", Proceedings of the 16th IEEE international conference on Image Processing (ICIP), Nov. 7, 2009, pp. 773-776, IEEE, Piscataway, NJ, USA, XP031628909, ISBN: 978-1-4244-5653-6.

First Office Action from counterpart Japanese Patent Application No. 2013-535108, mailed May 7, 2014, 19 pp.

Notice of Grounds for Rejection from counterpart Korean Patent Application No. 2013-7013016, dated Jun. 30, 2014, 17 pp.

Office Action from counterpart European Application No. 11 778 753.1, dated Sep. 4, 2014, 6 pp.

Response to European Communication from corresponding European Application No. 11 778 753.1-1908 dated Jan. 5, 2015 (14 pages).

McCann, et al., "Samsung's Response to the Call for Proposals on Video Compression Technology," Apr. 15-23, 2010; Joint Collaborative Team on Video Coding (JCT-VC) of ITU-T SG-16 WP3 and ISO/IEC JTC1/SC29/WG11, 1st meeting, Document: JCTVC-A124, Dresden, DE, Mar. 19, 2012, 42 pp.

* cited by examiner

ADAPTIVE SCANNING OF TRANSFORM COEFFICIENTS FOR VIDEO CODING

This application claims the benefit of U.S. Provisional Application No. 61/406,039, filed Oct. 22, 2010, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the upcoming High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into coding units, which may also be generally referred to as blocks. Each block can be further partitioned. Blocks in an intra-coded (I) frame or slice are encoded using spatial prediction with respect to neighboring reference blocks in the same frame or slice. Blocks in an inter-coded (P or B) frame or slice may use spatial prediction with respect to neighboring blocks in the same frame or slice or temporal prediction with respect to other reference frames.

SUMMARY

In general, this disclosure describes techniques for coding video data. This disclosure describes techniques for transforming residual video data and scanning transform coefficients during a video coding process. In general, blocks of a picture to be coded may be intra-mode encoded (e.g., encoded relative to reference samples in other blocks of the same picture) or inter-mode encoded (e.g., encoded relative to reference blocks of a previously coded picture). In either case, a video encoder forms predictive data for the block to be coded. The difference between the predictive data and the actual data of the block is represented by residual data. The video encoder may transform the residual data, e.g., from a spatial domain to a transform domain, thereby creating a number of transform coefficients.

Techniques of this disclosure relate generally to determining a transform coefficient scan order that may be used to serialize transform coefficients from a two-dimensional block to a one-dimensional array for entropy coding. According to aspects of this disclosure, a video encoder may determine whether to signal a scan order based on the number of transform coefficients being serialized. In particular, if the number of transform coefficients being serialized exceeds a predetermined threshold, the video encoder may determine and explicitly signal a certain scan order. Alternatively, if the number of transform coefficients being serialized does not exceed the predetermined threshold, the video encoder may not signal a specific scan order. In this example, the video encoder may use a predefined or default scan order to scan the transform coefficients.

In an example, a method for decoding video data includes determining a number of transform coefficients associated with a block of video data, and determining whether the number of transform coefficients exceeds a predetermined threshold. The method also includes identifying a scan order when the number of transform coefficients exceeds the predetermined threshold, wherein the scan order indicates an order in which the transform coefficients have been serialized from a two-dimensional array to a one-dimensional array. The method also includes applying the scan order to inverse scan the number of transform coefficients associated with a block of video data.

In another example, an apparatus for decoding video data comprises a video decoder configured to determine a number of transform coefficients associated with a block of video data, and to determine whether the number of transform coefficients exceeds a predetermined threshold. The video decoder is also configured to identify a scan order when the number of transform coefficients exceeds the predetermined threshold, wherein the scan order indicates an order in which the transform coefficients have been serialized from a two-dimensional array to a one-dimensional array, and to apply the scan order to inverse scan the number of transform coefficients associated with a block of video data.

In another example, an apparatus for decoding video data comprises a means for determining a number of transform coefficients associated with a block of video data, and a means for determining whether the number of transform coefficients exceeds a predetermined threshold. The apparatus also comprises a means for identifying a scan order when the number of transform coefficients exceeds the predetermined threshold, wherein the scan order indicates an order in which the transform coefficients have been serialized from a two-dimensional array to a one-dimensional array, and a means for applying the scan order to inverse scan the number of transform coefficients associated with a block of video data.

In another example, a computer program product comprising a computer-readable storage medium having stored thereon instructions that, when executed, cause a processor of a device for decoding video data to determine a number of transform coefficients associated with a block of video data; determine whether the number of transform coefficients exceeds a predetermined threshold; identify a scan order when the number of transform coefficients exceeds the predetermined threshold, wherein the scan order indicates an order in which the transform coefficients have been serialized from a two-dimensional array to a one-dimensional array; and apply the scan order to inverse scan the number of transform coefficients associated with a block of video data.

In another example, a method for encoding video data comprises determining a number of transform coefficients associated with a block of video data, and determining whether to signal a scan order based on whether the number of transform coefficients exceeds a predetermined threshold, wherein the scan order indicates an order in which the transform coefficients are serialized from a two-dimensional array to a one-dimensional array. The method also comprises signaling the scan order when the number of transform coefficients exceeds the predetermined threshold.

In another example, an apparatus for encoding video data comprises a video encoder configured to determine a number of transform coefficients associated with a block of video data, and to determine whether to signal a scan order based on whether the number of transform coefficients exceeds a predetermined threshold, wherein the scan order indicates an order in which the transform coefficients are serialized from a two-dimensional array to a one-dimensional array. The video encoder is also configured to signal the scan order when the number of transform coefficients exceeds the predetermined threshold.

In another example, an apparatus for encoding video data comprises a means for determining a number of transform coefficients associated with a block of video data, and a means for determining whether to signal a scan order based on whether the number of transform coefficients exceeds a predetermined threshold, wherein the scan order indicates an order in which the transform coefficients are serialized from a two-dimensional array to a one-dimensional array. The apparatus also comprises a means for signaling the scan order when the number of transform coefficients exceeds the predetermined threshold.

In another example, a computer program product comprising a computer-readable storage medium having stored thereon instructions that, when executed, cause a processor of a device for encoding video data to determine a number of transform coefficients associated with a block of video data; determine whether to signal a scan order based on whether the number of transform coefficients exceeds a predetermined threshold, wherein the scan order indicates an order in which the transform coefficients are serialized from a two-dimensional array to a one-dimensional array; and signal the scan order when the number of transform coefficients exceeds the predetermined threshold.

The details of one or more examples are set forth in the accompanying drawings and the description below. Other features, objects, and advantages will be apparent from the description and drawings, and from the claims.

DETAILED DESCRIPTION

Figure 1:
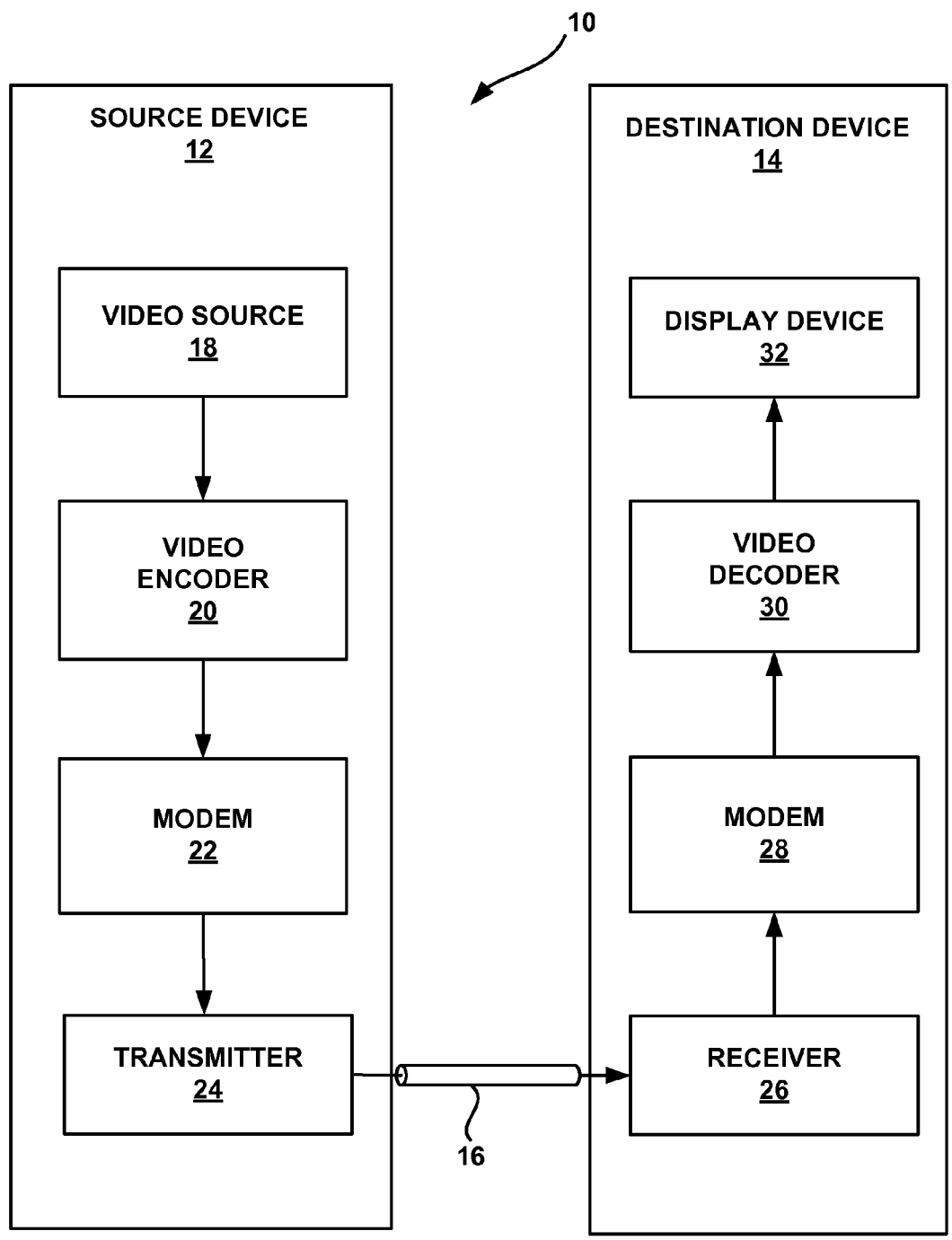
FIG. 1 is a block diagram illustrating an example video encoding and decoding system that may utilize techniques for determining whether to explicitly signal a scan order for a coding unit.

In general, this disclosure describes techniques for coding video data. More specifically, this disclosure describes techniques relating to transforming data and scanning transform coefficients during a video coding process. Encoded video data may include prediction data and residual data. A video encoder may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a reference block in a previously coded picture.

Following intra- or inter-prediction, a video encoder may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block. To further compress the residual value of a block, the residual value may be transformed into a set of transform coefficients in a transform domain. Ideally, the transform coefficients compact as much data (also referred to as "energy") as possible into as few coefficients as possible. The transform converts the residual values of the pixels from the spatial domain to a transform domain. The transform coefficients correspond to a two-dimensional matrix of coefficients that is ordinarily the same size as the original block. In other words, there are normally just as many transform coefficients as pixels in the original block. However, due to the transform, many of the transform coefficients may have values equal to zero.

The video encoder may then quantize the transform coefficients to further compress the video data. Quantization generally involves mapping values within a relatively large range to values in a relatively small range, thus reducing the amount of data needed to represent the quantized transform coefficients. In some cases, quantization may reduce some values to zero. Following quantization, the video encoder may scan the transform coefficients, producing a one-dimensional vector from the two-dimensional matrix including the quantized transform coefficients.

The video encoder may then entropy encode the resulting array to even further compress the data. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC).

This disclosure describes several techniques related to scanning and entropy encoding transform coefficients during a video coding process. In particular, this disclosure describes certain techniques related to determining whether to identify and explicitly signal a scan order for scanning a transform coefficient matrix based on a number of transform coefficients, which may be determined by the size of the transform coefficient matrix. The techniques may be applied by both video encoding and decoding units, including video encoder/decoders (CODECs) and processing units configured to perform video encoding and/or decoding.

Efforts are currently in progress to develop a new video coding standard, currently referred to as High Efficiency Video Coding (HEVC). The upcoming standard is also sometimes informally referred to as ITU-T H.265, although such a designation has not been formally made. The standardization efforts are based on a model of a video coding device referred to as the HEVC Test Model (HM). The proposed HEVC standard presumes several capabilities of video coding devices over other devices configured according to, e.g., ITU-T H.264/AVC. For example, whereas H.264 provides nine intra-prediction encoding modes, the proposed HEVC standard provides as many as thirty-five intra-prediction encoding modes.

The proposed HEVC standard refers to a block of video data as a coding unit (CU). Syntax data within a bitstream may define a largest coding unit (LCU), which is a largest coding unit in terms of the number of pixels. In general, a CU has a similar purpose to a macroblock coded according to H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the PU. The residual value may be transformed, quantized, and scanned. A TU is not necessarily limited to the size of a PU. Thus, TUs may be larger or smaller than corresponding PUs for the same CU. Accordingly, a PU may have a single TU or multiple TUs. In some examples, the maximum size of a TU may be the size of the corresponding CU. This disclosure also uses the term "block" to refer to any of a CU, PU, or TU.

In general, as noted above, the techniques of this disclosure relate to transforming, quantizing, scanning, and entropy encoding video data. In some examples, the techniques of this disclosure include determining whether to signal a scan order for transform coefficients based on, for example, a number of transform coefficients associated with a block of video data. That is, in an example, aspects of this disclosure relate to determining whether to signal a scan order for scanning transform coefficients associated with a TU based on the size of the TU, where the size of the TU provides an indication of the number of transform coefficients associated with the TU. In another example, aspects of this disclosure relate to determining whether to signal a scan order for a TU based on a number of significant transform coefficients associated with the TU. In yet another example, aspects of this disclosure relate to determining whether to signal a scan order for a TU based on the relative position of a last significant transform coefficient of the TU. In this example, the relative position of the last significant coefficient may be identified based on a last significant coefficient flag, as described in greater detail below.

This disclosure generally refers to a "scan order" as an order in which quantized transform coefficients are serialized, for example, from a two-dimensional block or matrix to a one-dimensional array. The scan order may identify a sequence in which transform coefficients are serialized by referring to the relative positions of the transform coefficient in the two-dimensional matrix as the transform coefficients are serialized. This disclosure may also refer to a "scan pattern" as a pattern in which quantized transform coefficients are serialized from a two-dimensional matrix to a one-dimensional array. That is, the scan pattern may identify a sequence in which transform coefficients are serialized by referring to a traced pattern through the two-dimensional matrix (e.g., a zig-zag pattern). Thus, the terms "scan order" and "scan pattern" may both be used to describe how a two-dimensional matrix of transform coefficients are serialized, and may be used interchangeably herein.

In an example, the techniques of this disclosure include determining whether to generate and signal a scan order for transform coefficients based on a number of transform coefficients by examining the size of a transform unit (TU) associated with a CU currently being encoded. For example, a 16×16 TU has 256 individual associated transform coefficients that may be arranged in a square matrix. According to some aspects of the disclosure, a video encoder may only generate and explicitly signal a scan order for a TU that exceeds a predetermined size threshold. If the TU does not exceed the predetermined size threshold, the video encoder may use a predetermined, or default scan order when scanning the transform coefficients associated with the TU. In this example, the video encoder may not signal the predetermined scan order to a video decoder.

In another example, the techniques of this disclosure include determining whether to generate and signal a scan order based on a number of transform coefficients by determining a number of significant coefficients that are included in a TU. For example, as noted above, after transformation, coefficients are typically quantized in order to further compress the video data. In some cases, quantization may reduce some values to zero. Thus, after quantization (and before serialization), a TU may include one or more transform coefficients having non-zero values, while one or more other transform coefficients may have zero value. Remaining non-zero quantized transform coefficients may be referred to as "significant" transform coefficients. The techniques of this disclosure include determining whether to signal a scan order based on whether a number of significant transform coefficients exceeds a predetermined threshold value. If the number of significant transform coefficients does not exceed the predetermined threshold, the video encoder may use a predetermined, or default scan order when scanning the transform coefficients associated with the TU. In this example, the video encoder may not signal the predetermined scan order to a video decoder.

The techniques of this disclosure also include determining whether to generate and signal a scan order based on a number of transform coefficients by identifying a position of a last significant coefficient that is included in a TU. That is, according to some examples, a video coder may generate a significance map for a TU, where the significance map identifies the relative positions of the significant coefficients of a TU. In an example, a significance map may be the same size as a TU and be comprised of flags that correspond to each transform coefficient. A video coder may set a significance flag to a value of "1" if the corresponding transform coefficient in that position is non-zero. Alternatively, a video coder may set a significance flag to a value of "0" if the corresponding transform coefficient in that position is zero valued. In some examples, a video encoder may serialize and entropy encode the significance map in the same manner as the transform coefficients. In another example, a video encoder may serialize the significance in reverse order relative to the transform coefficients.

Moreover, a video encoder may be configured to scan a transform coefficient matrix according to a predefined scan order (e.g., a zig-zag scan order). Accordingly, each transform coefficient of the matrix may be assigned a position that identifies when a given transform coefficient will be scanned relative to the other transform coefficients of the matrix. Given the transform coefficient positions, a video encoder may identify a position of a final non-zero transform coefficient, e.g., the last "significant" coefficient. In general, in this disclosure, a particular transform coefficient position may be referred to as being "greater than" another transform coefficient position if the particular transform coefficient is scanned later in time than the other transform coefficient position.

According to some aspects of the disclosure, a video encoder may only generate and signal a scan order for a TU that has a last significant coefficient that is greater than a predetermined threshold position. If the TU does not have one or more significant, i.e., non-zero, transform coefficients in a position greater than the predetermined threshold position, the video encoder may use a predetermined, or default scan order when scanning the transform coefficients associated with the TU. In this example, the video encoder may not signal the predetermined scan order to a video decoder.

While described with respect to a video encoder, it should be understood that such techniques may also be implemented by a video decoder. That is, a video decoder may determine whether a received bitstream includes an indication of a scan order based on a number of transform coefficients received in the bitstream. For example, the video decoder may determine whether the bitstream includes an indication of a scan order based on a size of a received TU (e.g., based on a number of transform coefficients included in the bitstream), a number of significant coefficients of a received TU, and/or a position of a last significant coefficient of a received TU. If the video decoder determines that the received bitstream includes an indication of a scan order (e.g., such as one or more syntax elements defining a scan order), the video decoder may identify the scan order and scan (or inverse scan) the transform coefficients according to the scan order. That is, the video decoder may apply the signaled scan order to produce a two dimensional array of transform coefficients from the serialized array of the received bitstream. If the video decoder determines that the received bitstream does not include an indication of a scan order, the video decoder may apply a default, predefined scan order (e.g., the same default scan order applied by the video encoder).

The techniques of this disclosure include determining whether to generate and signal a scan order for serializing transform coefficients associated with an inter-predicted block of video data, as well as transform coefficients associated with an intra-predicted block of video data. In addition, when explicitly signaling a scan order, aspects of this disclosure relate to optimizing such signaling. That is, for example, the techniques of this disclosure include using context information to improve scan order signaling.

According to aspects of this disclosure, by basing the determination of whether to generate and explicitly signal a particular scan order on the number of transform coefficients that need to be scanned, a video encoder may signal a particular scan order when it is potentially most efficient. That is, the techniques of this disclosure may strike a balance between computational and signaling costs associated with generating and signaling a particular scan order, and a potential increase in overall signaling efficiency achieved during entropy coding by implementing a particular scan order.

For example, when encoding a block of video data, a video encoder may expend computational resources by identifying a particular scan order. In addition, the video encoder may expend signaling resources by signaling the particular scan order to a video decoder. That is, the video encoder may be required to signal the particular scan order to a video decoder, thereby increasing the number of bits in the bitstream sent to a video decoder.

With a relatively large number of transform coefficients, however, the computational and signaling costs associated with implementing and explicitly signaling a scan order may be offset by increased efficiency at an entropy coding stage. For example, with a relatively large number of transform coefficients, implementing a specific scan order may increase the possibility of packing non-zero transform coefficients toward the front of a serialized array of transform coefficients, thereby increasing entropy coding efficiency. Moreover, implementing a specific scan order may increase the possibility of creating relatively long runs of zero-valued transform coefficients, thereby further increasing entropy coding efficiency. That is, packing the non-zero transform coefficients toward the front of the serialized array of transform coefficients, as well as increasing runs of zero-valued transform coefficients, may allow the transform coefficients to be signaled with fewer bits.

When encoding relatively small blocks of video data having relatively few associated transform coefficients and/or significant transform coefficients, it may not be worthwhile to generate and explicitly signal a specific scan order. For example, with relatively few transform coefficients there is a diminished opportunity to create relatively long runs of zero-valued transform coefficients. Accordingly, efficiency gained at the entropy coding stage by implementing and signaling a specific scan order may be offset by the bits required to signal the scan order. In this example, the video encoder may apply a predefined or fixed scan order, which may not have to be signaled to a video decoder. For example, in a simple case, a video encoder and a video decoder may be symmetrically preprogrammed to apply a certain scan order when serializing transform coefficients.

As noted above, the techniques of this disclosure include determining whether to explicitly signal a particular scan order based on the number of transform coefficients being serialized. According to some aspects of the disclosure, the video encoder may determine the number of transform coefficients according to the size of a quantized transform coefficient matrix. That is, the video encoder may determine the number of transform coefficients by examining the size of a TU associated with a CU. According to other aspects of the disclosure, the video encoder may determine the number of transform coefficients according to a number of significant coefficients, or a relative position of a last significant coefficient.

In some examples, the video encoder may only generate and signal a particular scan order when the size of the TU exceeds a predetermined threshold size. In an example, the threshold size may be an 8×8 matrix of transform coefficients, although a variety of other threshold sizes may be used (e.g., 4×4, 16×16, and the like). That is, the video encoder may only generate and signal a particular scan order when the size of the TU exceeds an 8×8 matrix of transform coefficients. If the TU does not exceed the size threshold, the video encoder may use a default or predefined scan order (e.g., a zig-zag scan order). In this case, the video encoder may not have to signal the scan order to the video decoder.

Alternatively or additionally, the video encoder may only generate and signal a particular scan order when a number of significant transform coefficients exceeds a predetermined threshold. In an example, the threshold position may be eight, although a variety of other threshold positions may be used (e.g., six, 10, 20, and the like). That is, the video encoder may only generate and signal a particular scan order if there are at least eight significant transform coefficients. If a TU does not include more significant transform coefficients than the threshold, the video encoder may use a predetermined, or default scan order when scanning the transform coefficients associated with the TU, which may not have to be signaled to a video decoder.

Alternatively or additionally, the video encoder may only generate and signal a particular scan order when the position of a last significant coefficient is greater than a predetermined threshold position. In an example, the threshold position may be eight, although a variety of other threshold positions may be used. That is, the video encoder may only generate and signal a particular scan order if there are eight transform coefficients prior to the last significant transform coefficient. If the TU does not have one or more significant, i.e., non-zero, transform coefficients in a position greater than the predetermined threshold position, the video encoder may use a predetermined, or default scan order when scanning the transform coefficients associated with the TU, which may not have to be signaled to a video decoder.

Aspects of this disclosure relate to determining whether to generate and signal a scan order for an inter-predicted block of video data, as well as an intra-predicted block of video data. As noted above, a video encoder may inter-predict a block of video data relative to data of a previously coded picture. In general, due to inherent inconsistency in predicted data, it may be hard to anticipate the locations of non-zero transform coefficients in a transform coefficient matrix. That is, non-zero transform coefficients may be scattered throughout a given transform coefficient matrix.

Accordingly, a video encoder may apply a predefined and fixed scan pattern (e.g., a zig-zag scan pattern) to scan transform coefficients. In another example, for inter-predicted blocks, the video encoder may apply an adaptive scan pattern to scan transform coefficients. That is, the video encoder may initially implement a fixed scan pattern, but adapt, or update the scan pattern while encoding blocks of a picture. The video encoder may, for example, collect statistics indicative of whether coefficients at locations tend to be zero-valued, and if a coefficient at a particular location is commonly zero-valued, the video encoder may elect to scan that coefficient later than other coefficients that commonly have non-zero values.

Techniques of this disclosure include determining whether to generate or identify and explicitly signal a scan order for an inter-predicted block based on the number of transform coefficients being serialized. According to aspects of the disclosure, the video encoder may explicitly signal a specific scan order only when a TU associated with a block that is currently being encoded exceeds a certain size. That is, prior to selecting a scan order, the video encoder may determine whether the size of a TU associated with a block being encoded exceeds a predetermined threshold size.

According to some aspects of the disclosure, if the size of the TU does not exceed the predetermined threshold size, the video encoder may utilize a predefined, fixed scan order (e.g., a zig-zag scan pattern). In this case, the video encoder may not signal the scan order. If the size of the TU exceeds the threshold size, however, the video encoder may identify or generate and explicitly signal a scan order in an attempt to increase entropy coding efficiency. For example, the video encoder may develop an adaptive scan pattern using statistics indicative of whether coefficients at certain locations tend to be zero-valued. In other examples, the video encoder may dynamically select a scan order by testing a variety of predefined scan orders and selecting the most efficient scan order. In such examples, the video encoder may signal the adaptive or selected scan order to a video decoder.

In other examples, the video encoder may only generate and signal a particular scan order when a number of significant transform coefficients exceed a predetermined threshold, or a relative position of a last significant coefficient is greater than a predetermined threshold position. That is, prior to selecting a scan order, the video encoder may determine whether a last significant coefficient position is greater than a predetermined threshold position. If the last significant coefficient position does not exceed the threshold, the video encoder may utilize a predefined, fixed scan order that is not signaled. If the last significant coefficient position does exceed the threshold, however, the video encoder may identify or generate and explicitly signal a scan order in an attempt to increase entropy coding efficiency.

With respect to an intra-predicted block of video data, as noted above, a video encoder may intra-predict a block using a particular intra-prediction mode. For example, a video encoder that is compliant with the proposed HEVC standard may be configured with up to thirty-five intra-prediction modes. In some examples, the video encoder may scan transform coefficients associated with intra-predicted blocks using a single, fixed scan pattern (e.g., a zig-zag pattern). In other examples, the video encoder may select a scan pattern based on another coding process.

For example, after intra-prediction, a video coder may scan transform coefficients based on the intra-prediction mode used for prediction. That is, even after a separable directional transform is applied to a two-dimensional matrix of residual values, the resulting two-dimensional transform coefficient matrix may still exhibit some directionality. Consider, for example, predicting a block of video data using a vertical intra-prediction mode. After prediction, transform, and quantization, the nonzero quantized transform coefficients associated with the block may tend to exist along the horizontal direction (e.g., along the relative top of the two-dimensional matrix). Accordingly, a video coder may scan the transform coefficients in the horizontal direction so that the non-zero coefficients in the two-dimensional matrix can be further compacted toward the beginning of the resulting one dimensional vector.

Techniques of this disclosure include determining whether to generate or identify and explicitly signal a scan order for an intra-predicted block of video data based on the number of transform coefficients being serialized. According to aspects of the disclosure, the video encoder may explicitly signal a specific scan order only when a TU associated with a block that is currently being encoded exceeds a certain size. In another example, the video encoder may explicitly signal a specific scan order only when a number of significant transform coefficients of a TU currently being encoded exceeds a predetermined threshold. In another example, the video encoder may explicitly signal a specific scan order only when a relative position of a last significant coefficient of a TU currently being encoded exceeds a predetermined threshold position.

The video encoder may identify or generate and explicitly signal a scan order in an attempt to increase entropy coding efficiency. For example, the video encoder may dynamically select a scan order by testing a variety of scan orders and selecting the most efficient scan order for that block of video data (e.g., according to a rate-distortion or other characteristic indicative of efficiency), or use an adaptive scan order based on statistics indicative of whether coefficients at certain locations tend to be zero-valued.

According to some aspects of the disclosure, if the video encoder does not generate a specific scan order, the video encoder may utilize a predefined, fixed scan order (e.g., a zig-zag scan pattern). In this case, the video encoder may not signal the scan order.

In this manner, determining whether to generate and signal a specific scan order based on the number of transform coefficients being serialized may aid in balancing computational and signaling costs associated with identifying and explicitly signaling a scan order with gains realized at an entropy coding stage. While certain aspects of this disclosure relate to determining whether to generate and signal a scan order based on a number of transform coefficients (or significant transform coefficients) associated with a transform unit (TU), it should be understood that the techniques of this disclosure relate generally to determining whether computational and signaling costs associated with determining and signaling a scan order may be outweighed by increased entropy coding efficiency achieved by using the specific scan order. Accordingly, in certain examples, other coding metrics may be used to determine whether it would be efficient to generate and signal a specific scan order. For example, rather than examining the size of a TU, the video encoder may determine whether to generate and signal a scan order based on a quantity of transform coefficients associated with a CU being encoded. In another example, a video encoder may determine whether to generate and signal a scan order based on a size of a CU or PU, which may indirectly provide an indication of the number of transform coefficients required for coding video data. That is, while a CU or PU may not provide an indication of a number of significant transform coefficients, a relatively larger CU or PU may be more likely to include a greater number of significant transform coefficients.

The techniques of this disclosure also include, when explicitly signaling a scan order, optimizing such signaling. For example, as noted above, scanning a two-dimensional matrix of transform coefficients produces a one-dimensional vector that can then be entropy encoded. In some examples, a video encoder may entropy encode the transform coefficients using variable length codes, context-adaptive binary arithmetic coding (CABAC), and other entropy coding methods. In such examples, the video encoder may also entropy-encode syntax elements such as, for example, a significant coefficient flag and a last coefficient flag. According to aspects of this disclosure, the video encoder may also entropy-encode the scan order of transform coefficients. That is, for example, this disclosure provides techniques for signaling a scan order using context based variable length code (VLC) tables and/or arithmetic coding methods that rely on context information from coding information of the CU currently being encoded or context information of neighboring CUs (e.g., prediction mode/direction, prediction unit size, a number of non-zero coefficients, and the like).

FIG. 1 is a block diagram illustrating an example video encoding and decoding system 10 that may utilize techniques for determining whether to explicitly signal a scan order for a coding unit. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern determining whether to explicitly signal a scan order for a coding unit, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for encoding and decoding of transform units of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining whether to explicitly signal a scan order for a coding unit may be performed by any digital video encoding and/or decoding device. Although the techniques of this disclosure are generally performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to determine whether to explicitly signal a scan order for a coding unit. The information communicated over channel 16 may include syntax information defined by video encoder 20, which is also used by video decoder 30, that includes syntax elements that describe characteristics and/or processing of coding units or other units of coded video data, e.g., groups of pictures (GOPs), slices, frames and the like. A quadtree data structure may form part of the syntax information for a largest coding unit. That is, each LCU may include syntax information in the form of a quadtree, which may describe how the LCU is split into sub-CUs as well as signaling information on how the LCU and sub-CUs are encoded.

Video decoder 30 may use the quadtree to determine how to decode CUs of a received picture. Video decoder 30 may then decode the CUs and send decoded video data to display device 32. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). As another example, video encoder 20 and video decoder 30 may operate according to the High Efficiency Video Coding (HEVC) standard, and may conform to the HEVC Test Model (HM). The techniques of this disclosure, however, are not limited to any particular coding standard, and may apply to HEVC or other standards or proprietary coding processes that are currently available or may emerge in the future. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented in software, a device may store instructions for the software in a suitable, non-transitory computer-readable medium and execute the instructions using one or more processors to perform the techniques of this disclosure. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on coding units within individual video frames in order to encode the video data. A coding unit may correspond to an LCU or a sub-CU, and the term CU may refer to an LCU or a sub-CU. Header information for an LCU may describe the size of the LCU, the number of times the LCU may be split (referred to as CU depth in this disclosure), and other information. Each video frame may include a plurality of slices, and each slice may include a plurality of LCUs.

As an example, the HEVC Test Model (HM) supports prediction in various CU sizes. The size of an LCU may be defined by syntax information. Assuming that the size of a particular CU is 2N×2N, intra-prediction in sizes of 2N×2N or N×N are supported, and inter-prediction in symmetric sizes of 2N×2N, 2N×N, N×2N, or N×N are supported.

In this disclosure, "N×N" and "N by N" may be used interchangeably to refer to the pixel dimensions of a block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data generally represents pixel differences between values of a PU and the values of collocated, unencoded pixels from the input video data. The TUs may include quantized values in the transform domain. When a DCT is used to transform the coefficients of a TU, the coefficients of the TU may be said to be in the frequency domain.

Video encoder 20 may implement any or all of the techniques of this disclosure to determine whether to explicitly signal a scan order for a coding unit. Likewise, video decoder 30 may implement any or all of these techniques to determine whether a particular scan order, other than a default scan order, was used for scanning transform coefficients.

Video encoder 20 may receive an LCU and determine whether to split the LCU into four quadrants, each comprising a sub-CU, or whether to encode the LCU without splitting. Following a decision to split an LCU into sub-CUs, video encoder 20 may determine whether to split each sub-CU into four quadrants, each comprising a sub-CU. Video encoder 20 may continue to recursively determine whether to split a CU, with a maximum number of splits indicated by the LCU depth. Video encoder 20 may provide a quadtree data structure indicative of the splitting of an LCU and sub-CUs of the LCU. The LCU may correspond to a root node of the quadtree. Each node of the quadtree may correspond to a CU of the LCU. Moreover, each node may include a split flag value indicative of whether the corresponding CU is split.

If the LCU is split, for example, video encoder 20 may set the value of the split flag in the root node to indicate that the LCU is split. Then, video encoder 20 may set values of child nodes of the root node to indicate which, if any, of the sub-CUs of the LCU are split. A CU that is not split may correspond to a leaf node of the quadtree data structure, where a leaf node has no child nodes.

Video encoder 20 may encode each sub-CU of the LCU corresponding to a leaf node in the quadtree data structure. For purposes of example, this disclosure describes the techniques relative to intra-prediction encoding. Thus, under this assumption, video encoder 20 may form prediction units (PUs) for each CU corresponding to a leaf node in the quadtree data structure. In some examples, video encoder 20 may select one of thirty-five different intra-prediction modes for the LCU and signal the selected intra-prediction mode in the root node of the quadtree. Then, for each CU corresponding to a leaf node, video encoder 20 may determine whether to form one PU having the same size as the CU, or to form four PUs representing quadrants of the CU. Each PU corresponds to prediction data retrieved from neighboring, previously coded CUs, according to the selected intra-prediction mode.

Following intra-predictive or inter-predictive coding to produce a PU for a CU, video encoder 20 may calculate residual data to produce residual values, and then apply a transform to one or more transform units (TUs) for the CU. The residual data may correspond to pixel differences between pixels of the unencoded picture and prediction values of a PU of a CU. Video encoder 20 may form one or more TUs including the residual data for the CU. Video encoder 20 may then transform the TUs. Video encoder 20 may select a transform based on an intra-prediction mode used to intra-mode predict a PU for the CU. In some examples, video encoder 20 may be configured to apply more than one transform to a TU, that is, a cascaded transform.

By transforming residual data for a TU, video encoder 20 produces a matrix of transform coefficients. This matrix generally has the same size as the input block to the transform. In general, the transform process transforms the residual data using a mathematical transform. Transformation is typically followed by quantization, which further compresses the data. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a vector that can be entropy encoded. That is, video encoder 20 may serialize the quantized transform coefficients using a predefined scan order, such as a zig-zag scan order. In other examples, video encoder 20 may perform an adaptive scan. To perform an adaptive scan, video encoder 20 may track statistics indicative of whether a particular position in the matrix of transform coefficients is more or less likely to be significant (e.g., non-zero). Video encoder 20 may adapt the scan pattern over time such that the scan pattern corresponds to these statistical likelihoods. That is, the adaptive scan pattern may attempt to ensure that the transform coefficients having a relatively higher probability of being significant (e.g., non-zero) are scanned before transform coefficients having a relatively lower probability of being significant.

According to aspects of this disclosure, video encoder 20 may determine whether to generate and signal a particular scan order based on the number of transform coefficients being serialized, which may be determined according to the size of a transform unit (TU) associated with a block of video data being encoded. For example, video encoder 20 may only signal a particular scan order when the size of the TU exceeds a predetermined threshold size. In an example, video encoder may only generate and signal a particular scan order when the size of the TU exceeds an 8×8 matrix of transform coefficients, although other sizes may also be used (e.g., 4×4 matrix, 16×16 matrix, and the like).

In some examples, if the TU does exceed the size threshold, video encoder 20 may apply and signal a scan order other than a default, or predetermined scan order. That is, in an example, video encoder 20 may apply an adaptive scan order, and signal the adaptive scan order to video decoder 30. In another example, video encoder 20 may test more than one preprogrammed scan order, and select the most efficient scan order, e.g., the scan order that packs the most significant transform coefficients toward the front of a serialized array of transform coefficients and/or creates long runs of zero-valued transform coefficients. After selecting a scan order, video encoder 20 may signal the selected scan order to video decoder 30.

If the TU does not exceed the size threshold, video encoder 20 may use a predefined scan order. Moreover, in this case, video encoder 20 may not signal the scan order. Video decoder 30, as discussed in greater detail below, may be configured to apply the same predefined scan order.

According to aspects of this disclosure, video encoder 20 may also determine whether to generate and signal a particular scan order based on a number of significant transform coefficients being serialized, or by determining a position of a last significant coefficient flag associated with a TU. For example, video encoder 20 may only generate and explicitly signal a scan order for a TU that has a last significant coefficient that is greater than a predetermined threshold position. If the TU does not have one or more significant, i.e., non-zero, transform coefficients in a position greater than the predetermined threshold position, the video encoder may use a predetermined, or default scan order when scanning the transform coefficients associated with the TU. In this example, the video encoder may not signal the predetermined scan order to video decoder 30.

When signaling a particular scan order, video encoder 20 may indicate the scan order by explicitly signaling the scan order. That is, the video encoder 20 may include one or more syntax elements in the bitstream that defines the scan order. In another example, video encoder 20 may indicate a particular scan order using an index value. That is, video encoder 20 may provide an index value in the bitstream that identifies a particular scan order in a predefined table of scan orders (e.g., a look-up table of scan orders). In this example, video decoder 30 may include a similar table of scan orders, thereby allowing video decoder 30 to select a particular scan order upon receiving the index.

In some examples, whether using an adaptive scan or a predetermined scan, video encoder 20 may zero out coefficients in the array following the scan. That is, video encoder 20 may set values for coefficients a positions N through the end of the array equal to zero. The value of N may relate to the size of the CU and/or the size of the TU. In some examples, video encoder 20 may zero out some transform coefficients in the matrix prior to being scanned, e.g., all coefficients in the matrix other than the coefficients in the upper-left corner of the matrix.

After scanning the transform matrix to form a one-dimensional vector, video encoder 20 may entropy encode the one-dimensional vector, e.g., according to content adaptive variable length coding (CAVLC), context adaptive binary arithmetic coding (CABAC), syntax-based context-adaptive binary arithmetic coding (SBAC), or another entropy coding methodology.

To perform CAVLC, video encoder 20 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan.

In accordance with the techniques of this disclosure, when video encoder 20 identifies a particular scan order (e.g., if the number of transform coefficients exceeds the threshold), video encoder 20 may entropy encode the scan order. For example, video encoder 20 may signal a scan order using context based variable length code (VLC) tables and/or arithmetic coding methods that rely on context information from coding information of the CU currently being encoded or context information of neighboring CUs (e.g., prediction mode/direction, prediction unit size, a number of non-zero coefficients, and the like).

Video decoder 30 may receive entropy encoded data representative of an encoded CU, including encoded PU and TU data. Video decoder 30 may inverse entropy encode the received data, forming encoded quantization coefficients. When video encoder 20 entropy encodes data using a variable length code algorithm, video decoder 30 may use one or more VLC tables to determine a symbol corresponding to a received codeword. When video encoder 20 entropy encodes data using an arithmetic coding algorithm, video decoder 30 may use a context model to decode the data, which may correspond to the same context model used by video encoder 20 to encode the data.

Video decoder 30 may then inverse scan the decoded coefficients, using an inverse scan that mirrors the scan used by video encoder 20. To inverse adaptively scan the coefficients, video decoder 30 may decode syntax elements including significant coefficient flags and last coefficient flags. In this way, video decoder 30 may regenerate the statistics used by video encoder 20 to perform the adaptive scan. Video decoder 30 may thereby form a two-dimensional matrix, from the one-dimensional vector resulting from the entropy decoding process.

According to aspects of the disclosure, video decoder 30 may be configured to apply a predetermined, default inverse scan order (e.g., symmetrical to the predetermined scan order applied by video encoder 20), or to apply an inverse scan order signaled by video encoder 20. That is, video decoder 30 may utilize a specific inverse scan order if one is signaled by video encoder 20, but may use a predefined, default scan order if a scan order is not signed by video encoder 20.

In some examples, to determine whether to decode and apply a specific inverse scan order, video decoder 30 may apply the same scan order signaling restrictions applied by video encoder 20. That is, video decoder 30 may determine whether to identify (e.g., identify an indication that a particular scan order was applied) and apply a specific inverse scan order based on the number of transform coefficients being scanned.

For example, according to aspects of the disclosure, video decoder 30 may identify a specific scan order only when a TU associated with a block that is currently being decoded exceeds a certain size. In another example, video decoder 30 may identify a specific scan order only when a number of significant transform coefficients of a TU currently being encoded exceeds a predetermined threshold. In another example, video decoder 30 may identify a specific scan order only when a relative position of a last significant coefficient of a TU currently being encoded exceeds a predetermined threshold position. In such examples, if video decoder 30 does not identify a specific scan order (e.g., a scan order signaled by a video encoder), video decoder 30 may apply a preprogrammed, default scan order to scan the transform coefficients.

Next, video decoder 30 may inverse quantize the coefficients in the two-dimensional matrix produced by the inverse scan. Video decoder 30 may then apply one or more inverse transforms to the two-dimensional matrix. The inverse transforms may correspond to the transforms applied by video encoder 20. Video decoder 30 may determine the inverse transforms to apply based on, for example, the intra-prediction mode used to form the PU, and if multiple transforms are available for a TU of a particular size, information signaled at the root of a quadtree corresponding to the CU currently being decoded.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
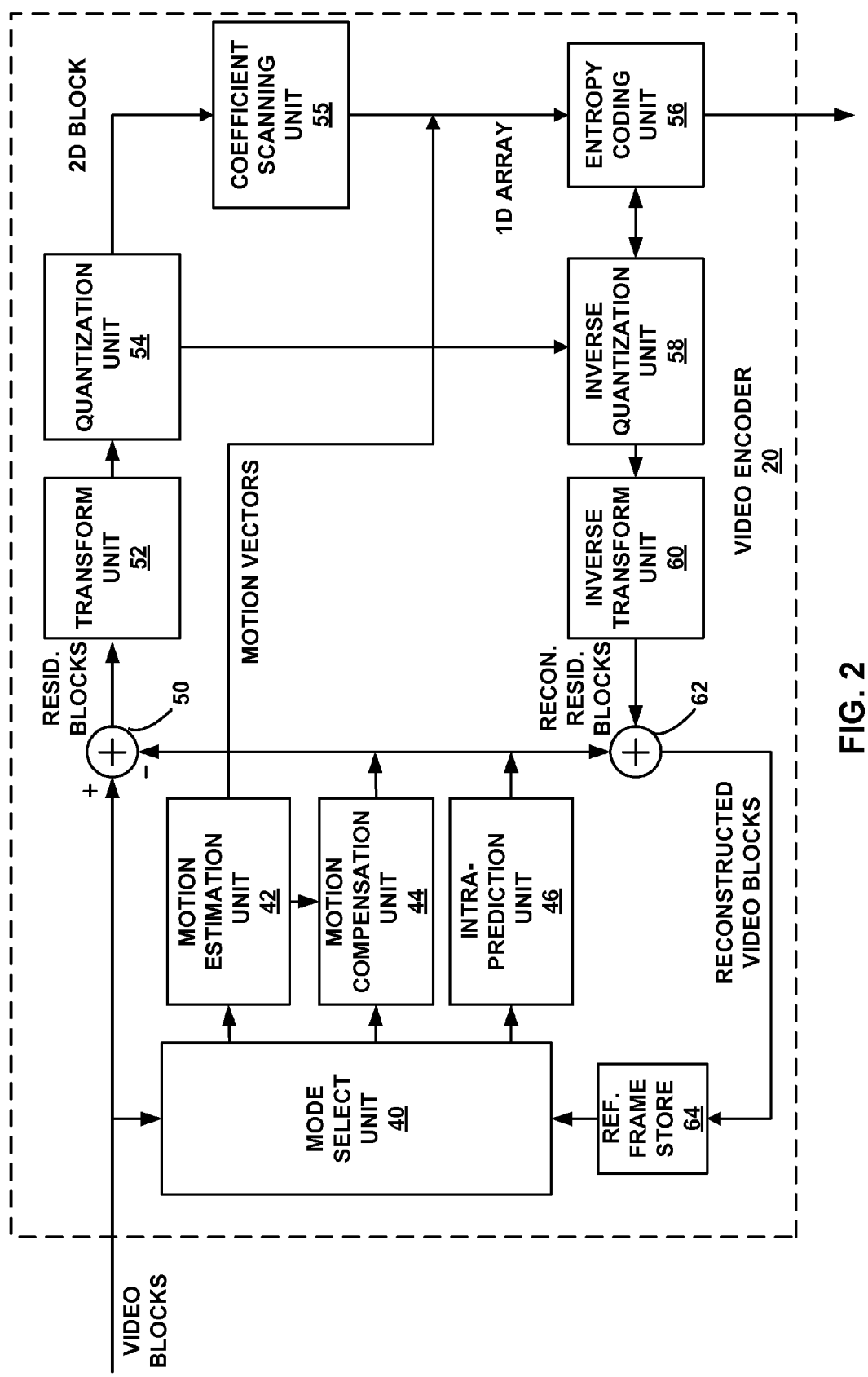
FIG. 2 is a block diagram illustrating an example video encoder that may implement any or all of the techniques for determining whether to explicitly signal a scan order for a coding unit described in this disclosure.

FIG. 2 is a block diagram illustrating an example of video encoder 20 that may implement any or all of the techniques for determining whether to explicitly signal a scan order for a coding unit described in this disclosure. Video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame store 64, summer 50, transform unit 52, quantization unit 54, coefficient scanning unit 55, and entropy coding unit 56. Transform unit 52 illustrated in FIG. 2 is the unit that performs the actual transformation, not to be confused with a TU of a CU. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results or a rate-distortion calculation, and provides the resulting intra- or inter-coded block to summer 50 to generate residual block data and to summer 62 to reconstruct the encoded block for use in a reference frame. Some video frames may be designated I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample is a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded frame by comparing the prediction unit to reference samples of a reference frame stored in reference frame store 64. In some examples, video encoder 20 may calculate values for sub-integer pixel positions of reference frames stored in reference frame store 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision. Motion estimation unit 42 sends the calculated motion vector to entropy coding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may intra-prediction encode the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., 35 directional prediction modes, based on the size of the CU being encoded.

Intra-prediction unit 46 may select an intra-prediction mode by, for example, calculating error values or rate-distortion (e.g., attempting to maximize compression without exceeding a predetermined distortion) for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to summer 50.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of values, where the number of values in the residual block is the same as the number of pixels in the PU corresponding to the residual block. The values in the residual block may correspond to the differences between collocated pixels in the PU and in the original block to be coded.

Transform unit 52 may form one or more transform units (TUs) from the residual block. Transform unit 52 applies a transform, such as a discrete cosine transform (DCT), a directional transform, or a conceptually similar transform, to the TU, producing a video block comprising transform coefficients. Accordingly, transform unit 52 may select a transform to apply to the TU based on the indication of the intra-prediction mode received from intra-prediction unit 46.

Transform unit 52 may send the resulting transform coefficients to quantization unit 54. Quantization unit 54 may then quantize the transform coefficients. As noted above, quantization generally involves mapping values within a relatively large range to values in a relatively small range, thus reducing the amount of data needed to represent the quantized transform coefficients. In some cases, quantization may reduce some values to zero.

Following quantization, coefficient scanning unit 55 may scan the quantized transform coefficients to serialize the quantized transform coefficients from a two-dimensional matrix to a one-dimensional array. In general, coefficient scanning unit 55 may apply a fixed, predefined scan pattern to scan the quantized transform coefficients, such as a zig-zag pattern (as shown and described with respect to FIG. 4). In other examples, coefficient scanning unit 55 may receive an indication of the selected intra-prediction mode from intra-prediction unit 46 or from transform unit 52, and apply a scan pattern based on the intra-prediction mode. Coefficient scanning unit 55 may also select and apply a particular scan based on various characteristics of the current TU, such as, for example, block type (inter or intra) and/or a type of transform applied to the TU (e.g., DCT or KLT). In still other examples, coefficient scanning unit 55 may select a particular scan order from a number of scan orders. That is, for example, coefficient scanning unit 55 may select a scan order from a number of predefined scan orders that has the most potential to increase entropy coding efficiency (e.g., a scan order that packs transform coefficients toward the front of the array).

In another example, coefficient scanning unit 55 may be configured to perform an adaptive scan. Initially (e.g., for a first TU of a current frame), coefficient scanning unit 55 may use a predetermined scan pattern. Over time, coefficient scanning unit 55 may update the scan pattern to perform the adaptive scan. In general, the goal of the adaptive scan is to determine a probability that a particular transform coefficient will be non-zero. Then, the scan order generally proceeds from coefficients with the highest probability of being non-zero to the lowest probability of being non-zero. Coefficient scanning unit 55 may determine these probabilities over time using various statistics and calculations. Moreover, coefficient scanning unit 55 may track separate statistics for each intra-prediction mode, transform, cascaded transform, or any combination thereof.

According to aspects of this disclosure, coefficient scanning unit 55 may determine whether to generate and apply a particular scan order based on the number of transform coefficients being serialized, which may be determined according to the size of a transform unit (TU) associated with a block of video data being encoded, a number of significant transform coefficients, or according to the position of the last significant coefficient. In some examples, coefficient scanning unit 55 may be responsible for determining whether to generate and apply a particular scan order, while another unit of video encoder 20, such as entropy coding unit 56 may be responsible for signaling the scan order, i.e., generating a bitstream to be sent to another device, such as a video decoder.

In some examples, coefficient scanning unit 55 may only generate and/or apply a particular scan order when the number of quantized transform coefficients exceeds a threshold, which may be determined according to whether the size of a TU being scanned exceeds a predetermined threshold size. In an example, video encoder 20 may only generate and/or apply a particular scan order when the size of the TU exceeds an 8×8 matrix of transform coefficients, although other sizes may also be used (e.g., 4×4 matrix, 16×16 matrix, and the like).

If the TU does exceed the size threshold, coefficient scanning unit 55 may select and apply a scan order other than a default, or predetermined scan order. In an example, coefficient scanning unit 55 may select a scan order based on various characteristics of the current TU, such as, for example, block type (inter or intra), prediction mode (for intra-predicted blocks), and/or a type of transform applied to the TU (e.g., DCT or KLT). In other examples, coefficient scanning unit 55 may select a scan pattern from a number of scan patterns that has the most potential to increase entropy coding efficiency. Coefficient scanning unit 55 may also develop and apply an adaptive scan order to scan the transform coefficients. In addition to selecting and applying a particular scan order, coefficient scanning unit 55 may also signal, or prompt another unit of video encoder 20, such as entropy coding unit 56, to signal the selected scan order. As noted above, the scan order may be explicitly signaled, or indicated using an index value that corresponds with a look-up table of predefined scan orders.

Alternatively, if the TU does not exceed the size threshold, coefficient scanning unit 55 may apply a default, or predetermined scan order. In this case, coefficient scanning unit 33 may not signal, or may not prompt another unit of video encoder, such as entropy coding unit 56, to signal a particular scan order.

In another example, coefficient scanning unit 55 may only generate and/or apply a particular scan order when a TU that has a last significant coefficient that is greater than a predetermined threshold position (e.g., a threshold position of eight), which may be indicative of the number of significant transform coefficients. If the TU does not have one or more significant transform coefficients in a position greater than the predetermined threshold position, coefficient scanning unit 55 may apply a default, or predetermined scan order that is not signaled.

According to some aspects of the disclosure, certain techniques ascribed to coefficient scanning unit 55, such as determining whether to explicitly signal a scan order, may be performed by another unit of video encoder 20. For example, in alternative arrangement, entropy coding unit 56 or quantization unit 54 may be configured to determine whether to select and explicitly signal a scan order.

Entropy coding unit 56 may entropy encode the serialized quantized transform coefficients, as well as syntax elements for the coefficients. According to some aspects of the disclosure, entropy coding unit 56 may work in tandem with coefficient scanning unit. That is, for example, entropy coding unit 56 may entropy encode the serialized transform coefficients and syntax elements while coefficient scanning unit 55 performs a scan. The syntax elements may include a significant coefficient flag that indicates whether a particular coefficient is significant (e.g., non-zero) and a last coefficient flag that indicates whether a particular coefficient is the last coefficient scanned in the adaptive scan. A video decoder may use these syntax elements to inverse scan the coefficients encoded by entropy coding unit 56. In some examples, a video decoder may use the syntax elements to reconstruct a dynamically updating scan table, such that the video decoder can inverse scan the coefficients encoded by entropy coding unit 56.

To entropy encode the syntax elements, entropy coding unit 56 may perform CABAC and select context models based on, for example, the number of significant coefficients in the previously scanned N coefficients, where N is an integer value that may be related to the size of the block being scanned. Entropy coding unit 56 may also select the context model based on a prediction mode used to calculate residual data that was transformed into the block of transform coefficients, and a type of transform used to transform the residual data into the block of transform coefficients. When the corresponding prediction data was predicted using an intra-prediction mode, entropy coding unit 56 may further base the selection of the context model on the direction of the intra-prediction mode.

According to aspects of this disclosure, entropy coding unit 56 may perform entropy encoding to code the scan order of transform coefficients. That is, for example, entropy coding unit 56 may signal a scan order using context based variable length code (VLC) tables and/or arithmetic coding methods that rely on context information from coding information of the CU currently being encoded or context information of neighboring CUs (e.g., prediction mode/direction, prediction unit size, a number of non-zero coefficients, and the like).

In some cases, entropy coding unit 56 or another unit of video encoder 20 may be configured to perform other coding functions, in addition to entropy coding. For example, entropy coding unit 56 may be configured to determine CBP values for the macroblocks and partitions. Also, in some cases, entropy coding unit 56 may perform run length coding of the coefficients in a macroblock or partition thereof.

Inverse quantization unit 58 and inverse transform unit 60 apply inverse quantization and inverse transformation, respectively, to reconstruct the residual block in the pixel domain, e.g., for later use as a reference block for predictive coding. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
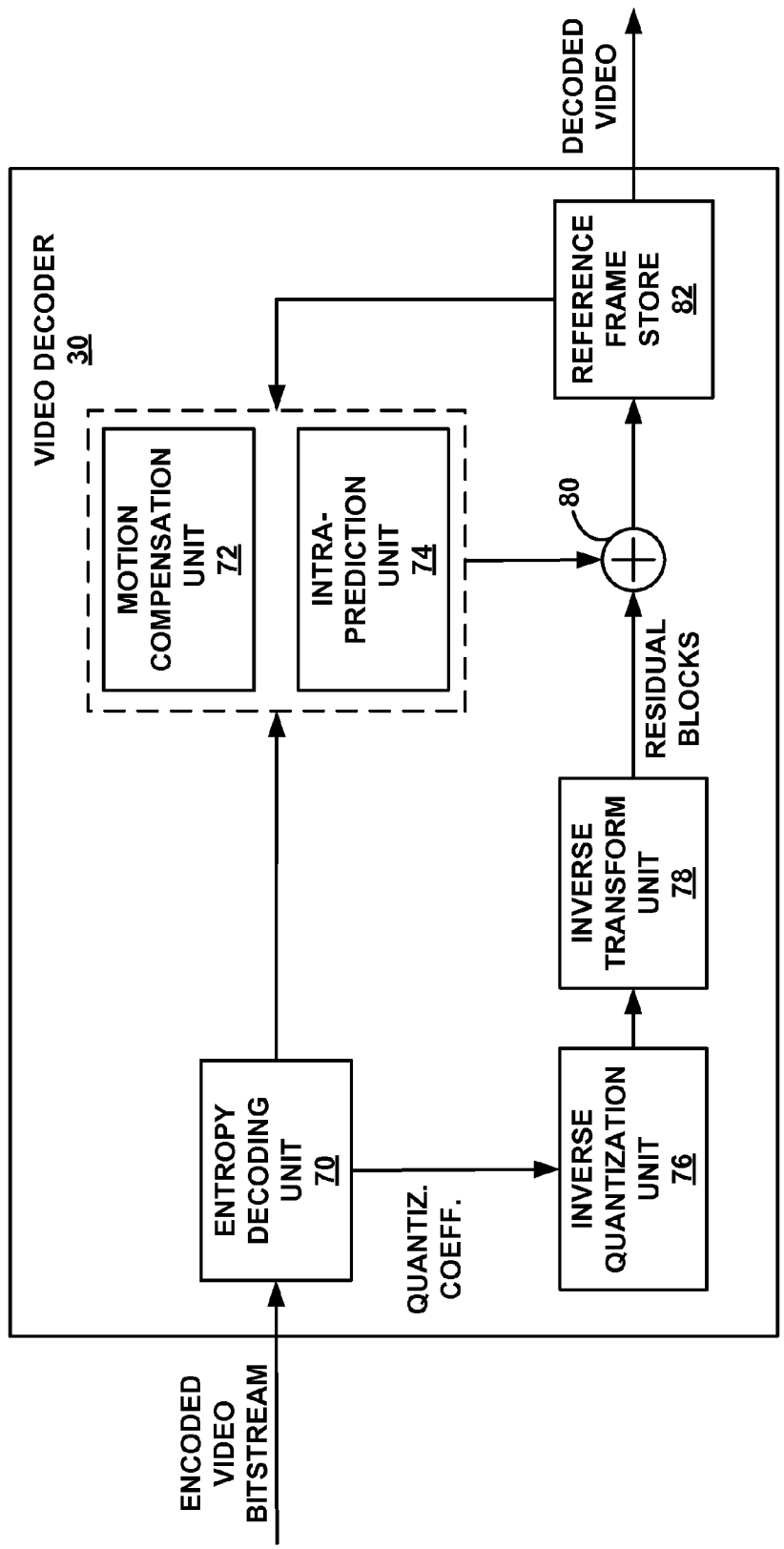
FIG. 3 is a block diagram illustrating an example of video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra-prediction unit 74 may generate prediction data for a current block of a current frame based on a signaled intra-prediction mode and data from previously decoded blocks of the current frame.

In some examples, entropy decoding unit 70 or inverse quantization unit 76 may scan the received values using a scan mirroring that used by video encoder 20. In the example of FIG. 3, video decoder 30 may be configured to apply a predetermined, default inverse scan order (e.g., symmetrical to the predetermined scan order applied by video encoder 20), or to apply an inverse scan order based on a scan order signaled by video encoder 20. That is, video decoder 30 may utilize a specific inverse scan order if one is signaled by video encoder 20, but may use a predefined, default scan order if a scan order is not signed by video encoder 20.

In some examples, to determine whether to decode and apply a specific inverse scan order, video decoder 30 may apply the same scan order signaling restrictions applied by video encoder 20. That is, video decoder 30 may determine whether to identify a specific inverse scan order based on the number of transform coefficients being scanned. In some examples, video decoder 30 may only identify a particular inverse scan order if the number of transform coefficients being inverse scanned is greater than a threshold. That is, for example, video decoder 30 identify a particular inverse scan order if the number of transform coefficients being inverse scanned is greater than a threshold, but may use a predefined, default scan order if the number of transform coefficients is less than or equal to the threshold.

When decoding a scan order that has been signaled by a video encoder, video decoder 30 may operate in a manner symmetrical to video encoder 30. For example, to inverse adaptively scan the coefficients, video decoder 30 may decode syntax elements including significant coefficient flags and last coefficient flags to regenerate the statistics used by video encoder 20 to perform the adaptive scan. Video decoder 30 may thereby form a two-dimensional matrix from the one-dimensional vector resulting from the entropy decoding process. In another example, video decoder 30 may use the same criteria as video encoder 20 to select a certain inverse scan from a number of inverse scans.

Inverse quantization unit 76 inverse quantizes, i.e., de-quantizes, the quantized transform coefficients provided in the bitstream and decoded by entropy decoding unit 70. The inverse quantization process may include a conventional process, e.g., as defined by the H.264 decoding standard or by HEVC. The inverse quantization process may include use of a quantization parameter QP calculated by video encoder 20 for the CU to determine a degree of quantization and, likewise, a degree of inverse quantization that should be applied.

Inverse transform unit 58 applies an inverse transform, e.g., an inverse DCT, an inverse integer transform, an inverse rotational transform, or an inverse directional transform. In some examples, inverse transform unit 78 may determine an inverse transform based on an intra-prediction mode signaled for a received intra-prediction encoded block. If the block is of a size for which more than one transform is possible, based on the intra-prediction mode, then inverse transform unit 78 may determine a transform to apply to the current block based on a signaled transform at the root node of a quadtree for an LCU including the current block. In some examples, inverse transform unit 78 may apply a cascaded inverse transform, e.g., first an inverse rotational transform followed by an inverse directional transform.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74 use some of the syntax information (e.g., provided by a quadtree) to determine sizes of LCUs used to encode frame(s) of the encoded video sequence, split information that describes how each CU of a frame of the encoded video sequence is split (and likewise, how sub-CUs are split), modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 4:
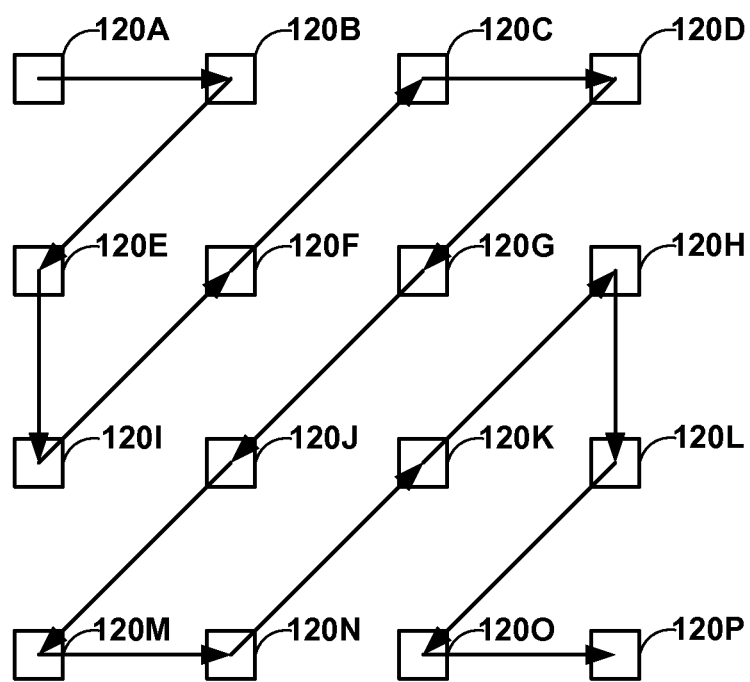
FIG. 4 is a conceptual diagram illustrating an example zig-zag scan of transform coefficients.

FIG. 4 is a conceptual diagram illustrating an example zig-zag scan of positions associated with a block of video data 120A-120P (positions 120). In some examples, each position 120 may include an associated transform coefficient. Video encoder 20 may be configured to scan a block of coefficients using the zig-zag scan of FIG. 4 following, e.g., application of a DCT to a residual block. In this example, the zig-zag scan starts at position 120A, then proceeds to position 120B, then to position 120E, then to position 120I, then to position 120F, then to position 120C, then to position 120D, then to position 120G, then to position 120J, then to position 120M, then to position 120N, then to position 120K, then to position 120H, then to position 120L, then to position 120O, and finally to position 120P.

By performing this scan, the two-dimensional arrangement of transform coefficients may be converted into a one-dimensional array including values for each of positions 120. These values may be arranged in the array in the order of the scan. For example, the value for position 120A may be first in the array, followed by values for positions 120B, 120E, 120I, 120F, and so on.

The zig-zag scan of FIG. 4 may be associated with a DCT applied to a residual block to form transform coefficients. In general, the DCT compacts the energy of positions 120 into the upper-left corner of the transformed block. Accordingly, the lowest frequency coefficients may generally occur close to the upper-left corner following the DCT, while the highest frequency coefficients may generally occur close to the bottom-right corner following the DCT. Accordingly, the zig-zag scan may be configured to attempt to ensure that lower frequency coefficients are placed earlier in the array than higher frequency coefficients. In this manner, a video encoder may compress data by zeroing out coefficients later in the array, which should correspond to higher frequency coefficients.

Other predefined scan patterns may also be defined for other transforms. For example, each directional transform may be associated with a scan pattern that is designed to place low frequency coefficients resulting from the directional transform earlier in an array than higher frequency coefficients. One of the directional transforms may cause lower frequency coefficients to occur along the far left column of a block of transform coefficients, in which case a corresponding scan may be defined that starts at position 120A, then proceeds to position 120E, then to position 120I, then to position 120M, then to 120B, and so on. As another example, another one of the directional transforms may cause lower frequency coefficients to occur along the top row of a block of transform coefficients, in which case a corresponding scan may be defined that starts at position 120A, then proceeds to position 120B, then to position 120C, then to position 120D, then to position 120E, and so on.

In some examples, video encoder 20 may be configured to perform an adaptive scan, rather than a predefined scan. The adaptive scan may vary over time based on statistics indicative of whether particular coefficients (that is, coefficients corresponding to positions 120) are significant. Moreover, video encoder 20 may calculate separate sets of statistics based on, for example, an intra-prediction mode selected to predict a block, an index of a rotational transform to apply following an initial transform, or other factors.

According to aspects of this disclosure, video encoder 20 may only apply and signal a particular scan order when the number of quantized transform coefficients exceeds a threshold. In some examples, the number of quantized transform coefficients may be determined according to the size of a TU being scanned. For example, if the number of quantized transform coefficients being scanned does not exceed a predetermined threshold, video encoder 20 may apply a predetermined, default scan order, such as the zig-zag scan order shown in FIG. 4. In this case, video encoder 20 may not signal the scan order. Alternatively, if the number of quantized transform coefficients being scanned does exceed a predetermined threshold, video encoder 20 may select and signal a particular scan order.

In other examples, the number of quantized transform coefficients may be determined according to the position of the last significant coefficient. For example, if the position of the last significant coefficient does not exceed a predetermined threshold position, video encoder 20 may apply a predetermined, default scan order, such as the zig-zag scan order shown in FIG. 4 without signaling the scan order. Alternatively, if the position of the last significant coefficient is greater than a predetermined threshold position, video encoder may select and signal a particular scan order.

When video encoder 20 applies and signals a particular scan order, the video encoder 20 may select a scan order based on various characteristics of the current TU, such as, for example, block type (inter or intra), prediction mode (for intra-predicted blocks), and/or a type of transform applied to the TU (e.g., DCT or KLT). In other examples, video encoder 20 may select a scan order that has the most potential to increase entropy coding efficiency from a number of scan orders. In still other examples, video encoder 20 may develop, apply, and signal an adaptive scan order, as described above.

Techniques of this disclosure relate to determining whether to apply and signal a particular scan order based on the size of a TU being scanned. According to some aspects of the disclosure, video encoder 20 may only apply and signal a particular scan order when the size of the TU exceeds an 8×8 matrix of transform coefficients, although other sizes may also be used (e.g., 4×4 matrix, 16×16 matrix, and the like). If the TU being scanned is equal to or less than the size threshold, video encoder 20 may apply the default, or predetermined scan order. In this example, video encoder 20 may not signal a particular scan order, and a video decoder, such as video decoder 30, may be configured to apply the same default, or predetermined scan order. Alternatively, if the TU being scanned exceeds the size threshold, video encoder 20 may apply and signal a scan order other than a default, or predetermined scan order, as described above.

Techniques of this disclosure also relate to determining whether to apply and signal a particular scan order based on the position of the last significant coefficient. According to some aspects of the disclosure, video encoder 20 may only apply and signal a particular scan order when the position of the last significant coefficient exceeds eight coefficients, although other coefficient positions may also be used (e.g., 16, 32, and the like). If the last significant coefficient position is equal to or less than the position threshold, video encoder 20 may apply the default, or predetermined scan order without signaling the scan order. Alternatively, if the last significant coefficient position exceeds the position, video encoder 20 may apply and signal a scan order other than a default, or predetermined scan order, as described above.

Figure 5:
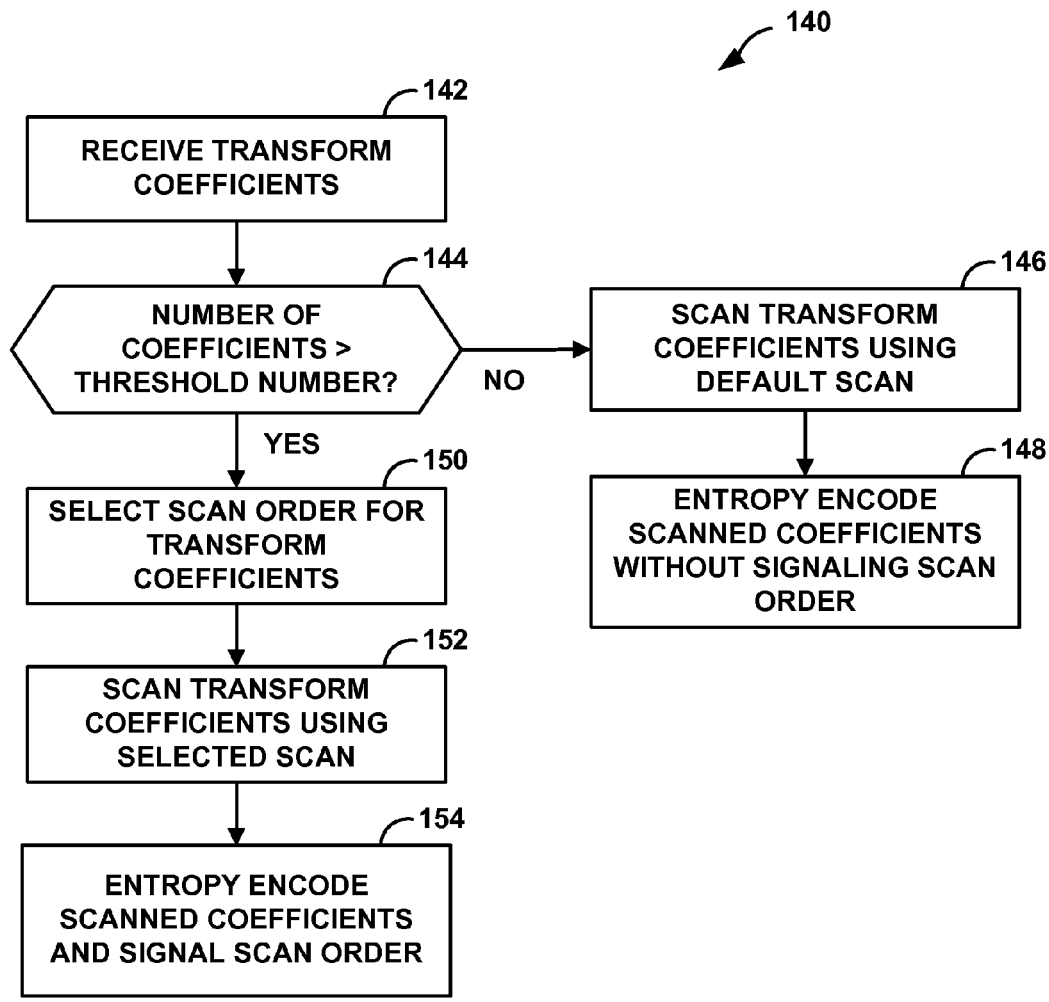
FIG. 5 is a flowchart illustrating an example method for determining whether to signal a scan order for scanning transform coefficients, according to aspects of this disclosure.

FIG. 5 is a flowchart illustrating an example method 140 for determining whether to signal a scan order for transform coefficients, according to aspects of this disclosure. In the example shown in FIG. 5, the method generally includes determining whether to signal a scan order for transform coefficients associated with a TU based on the size of the TU being encoded. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 5.

The example method 140 shown in FIG. 5 begins with receiving transform coefficients (142). For example, a component of video encoder, such as coefficient scanning unit 55, may receive a two-dimensional matrix of transform coefficients associated with a TU currently being encoded. That is, coefficient scanning unit 55 of video encoder 20 may receive a quantized transform coefficient matrix associated with a two-dimensional transform unit (TU) from quantization unit 54. According to aspects of this disclosure, coefficient scanning unit 55 may be responsible for serializing the transform coefficients to produce a one dimensional array of transform coefficients that can be entropy coded.

Coefficient scanning unit 55 may determine whether the number of transform coefficients exceed a predetermined threshold (144). In an example, video encoder 20 may determine whether the number of transform coefficients exceed the threshold based on a size of the TU currently being encoded. In an example, coefficient scanning unit 55 may determine whether the size of the transform coefficient matrix exceeds a predetermined threshold of 8×8 transform coefficients, although other thresholds may be used (e.g., 4×4, 16×16, and the like). If the size of the transform coefficient matrix is less than or equal to the threshold matrix size, coefficient scanning unit 55 may scan the transform coefficient matrix using a default scan order (146). In addition, entropy coding unit 56 may entropy encode the scanned coefficients without signaling a scan order (148).

If the size of the number of transform coefficients exceeds the threshold, however, coefficient scanning unit 55 may select a scan order for the transform coefficients (150). According to aspects of this disclosure, coefficient scanning unit 55 may select a particular scan based on various characteristics of the TU being encoded, such as, for example, block type (inter or intra), prediction mode/direction, and/or a type of transform applied to the TU. In other examples, as described in greater detail with respect to FIG. 7, coefficient scanning unit 55 may select an adaptive scan.

Coefficient scanning unit 55 may then scan the transform coefficients using the selected scan order (152). In addition, entropy coding unit 56 may entropy encode the scanned transform coefficients, as well as signal the scan order used to scan the transform coefficients (154). According to aspects of this disclosure, as described in greater detail with respect to FIG. 8 below, entropy coding unit 56 may signal the scan order using a context model. That is, entropy coding unit 56 may signal the scan order using context based variable length code (VLC) tables and/or arithmetic coding methods that rely on context information from coding information of the CU currently being encoded or neighboring CUs (e.g., prediction mode/direction, prediction unit size, a number of non-zero coefficients, and the like).

It should also be understood that the steps shown and described with respect to FIG. 5 are provided as merely one example. For example, while the threshold comparison shown and described in FIG. 5 is associated with a TU, coding metrics other than TU size may be used to determine whether to signal a specific scan order. For example, rather than examining the size of a TU, the video encoder 20 may determine whether to signal a scan order based on a size of a CU or PU, which also may indirectly provide an indication of a number of transform coefficients.

In addition, while certain aspects of FIG. 5 are generally described as being carried out by coefficient scanning unit 55 of video encoder 20, it should be understood that a variety of other units or modules may be configured to carry out such aspects, such as entropy coding unit 56. Moreover, the steps of the method of FIG. 5 need not necessarily be performed in the order shown in FIG. 5, and fewer, additional, or alternative steps may be performed.

Figure 6:
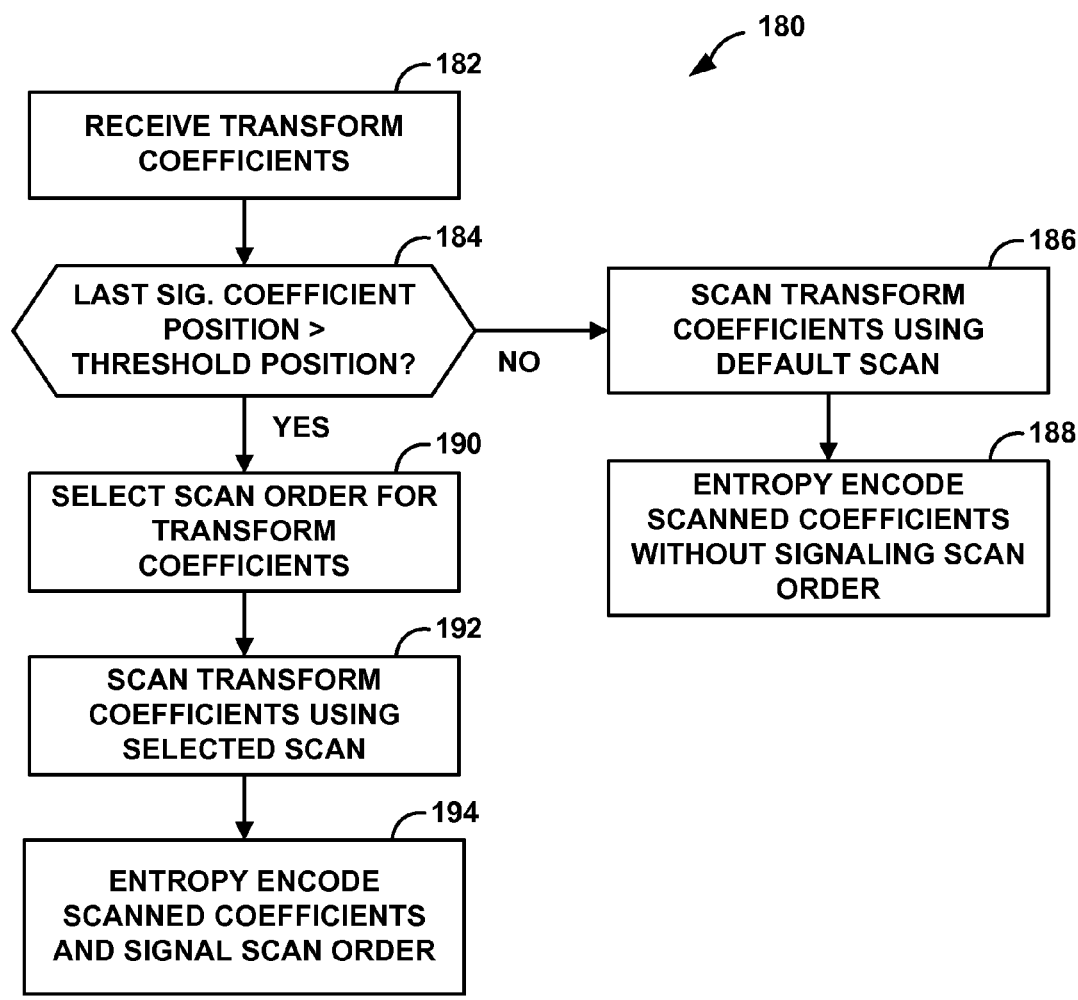
FIG. 6 is a flowchart illustrating another example method for determining whether to signal a scan order for scanning transform coefficients, according to aspects of this disclosure.

FIG. 6 is a flowchart illustrating another example method 180 for determining whether to signal a scan order for transform coefficients, according to aspects of this disclosure. In the example shown in FIG. 6, the method generally includes determining whether to signal a scan order for transform coefficients associated with a TU based on a position of a last significant coefficient of the TU. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 6.

The example method 180 shown in FIG. 6 begins with receiving transform coefficients (182). For example, a component of video encoder, such as coefficient scanning unit 55, may receive a two-dimensional matrix of transform coefficients associated with a TU currently being encoded. That is, coefficient scanning unit 55 of video encoder 20 may receive a quantized transform coefficient matrix associated with a two-dimensional transform unit (TU) from quantization unit 54. According to aspects of this disclosure, coefficient scanning unit 55 may be responsible for serializing the transform coefficients to produce a one dimensional array of transform coefficients that can be entropy coded.

Coefficient scanning unit 55 may then determine whether a position of a last significant coefficient of the current transform coefficient matrix is greater than a predetermined threshold position (184). In an example, coefficient scanning unit 55 may determine whether the position of the last significant coefficient is greater than eight, although other threshold positions may be used (e.g., 16, 32, and the like), which may provide an indication of a number of significant transform coefficients included in the TU. If the position of the last significant coefficient of the transform coefficients is less than or equal to the threshold position, coefficient scanning unit 55 may scan the transform coefficients using a default scan order (186). In addition, entropy coding unit 56 may entropy encode the scanned coefficients without signaling a scan order (188).

If the position of the last significant coefficient of the transform coefficients is greater than the threshold position, however, coefficient scanning unit 55 may select a scan order for the transform coefficients (190). As described with respect to FIG. 5 above, coefficient scanning unit 55 may select a particular scan based on various characteristics of the TU being encoded or may select an adaptive scan. Coefficient scanning unit 55 may then scan the transform coefficients using the selected scan order (192). In addition, as described with respect to step (154) of FIG. 5, entropy coding unit 56 may entropy encode the scanned transform coefficients, as well as signal the scan order used to scan the transform coefficients (194).

It should also be understood that the steps shown and described with respect to FIG. 6 are provided as merely one example. For example, while certain aspects of FIG. 6 are generally described as being carried out by coefficient scanning unit 55 of video encoder 20, it should be understood that a variety of other units or modules may be configured to carry out such aspects, such as entropy coding unit 56. Moreover, the steps of the method of FIG. 6 need not necessarily be performed in the order shown in FIG. 6, and fewer, additional, or alternative steps may be performed.

Figure 7:
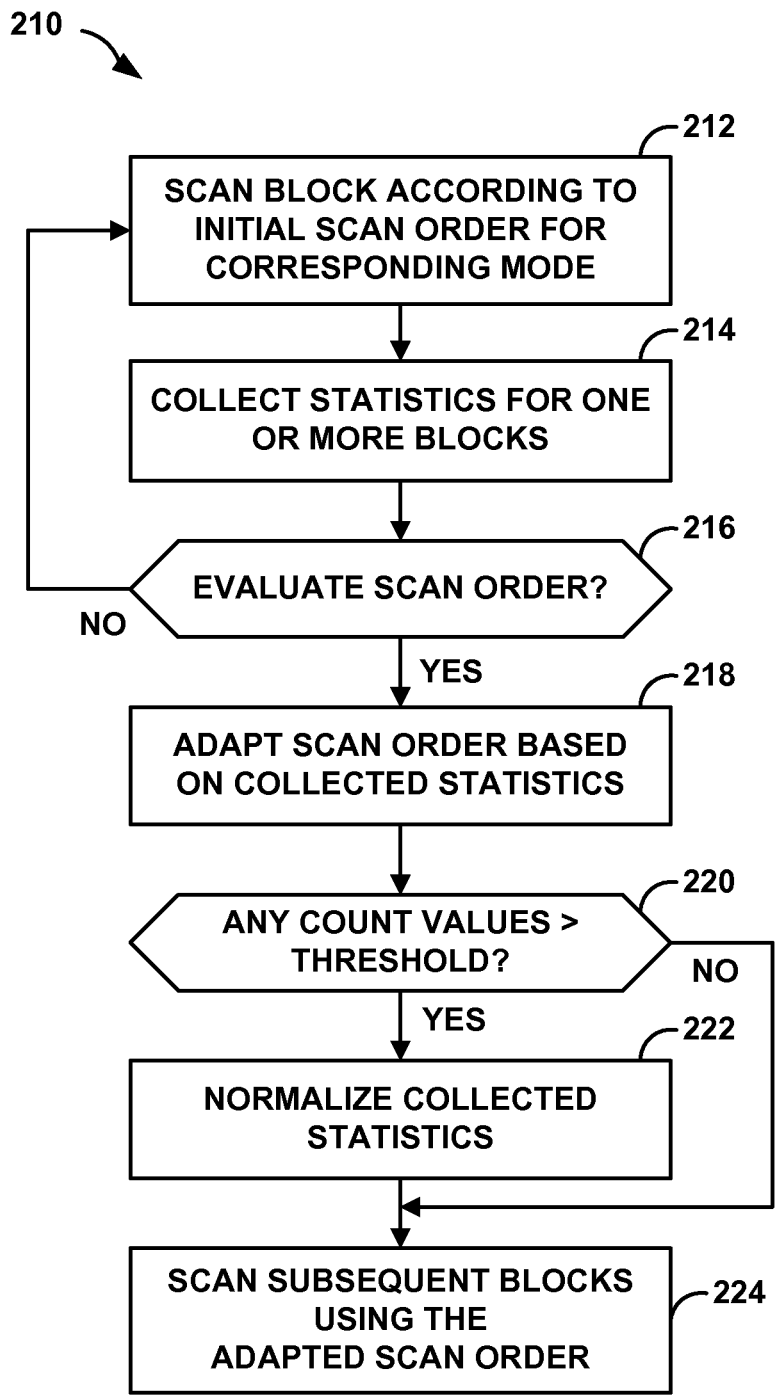
FIG. 7 is a flowchart illustrating an example method for performing an adaptive scan.

FIG. 7 is a flowchart illustrating an example method 210 for performing an adaptive scan. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 7.

According to techniques of this disclosure, the techniques for adaptively scanning coefficients shown in FIG. 7 may correspond to steps 150-154 of FIG. 5 or steps 190-194 of FIG. 6. That is, for example, the techniques for adaptively scanning coefficients may be applied when a TU size exceeds a predetermined threshold size, or when a last significant coefficient of a TU exceeds a predetermined threshold position. In such examples, video encoder 20 may generate and signal the adaptive scan, according to the example method 210 shown in FIG. 7. It should be understood, however, that the method shown in FIG. 7 is provided as merely one example. For example, video encoder 20 may also select a scan order based on various characteristics of the TU being encoded, such as, for example, block type (inter or intra), prediction mode/direction, and/or a type of transform applied to the TU. Moreover, the steps of FIG. 7 need not necessarily be performed in the order shown in FIG. 7, and fewer, additional, or alternative steps may be performed.

As shown in FIG. 7, to perform a basic adaptive scan, coefficient scanning unit 55 scans coefficients of a block in accordance with an initial scan order defined for the corresponding prediction mode of the current block (212). From the perspective of video encoder 20, scanning converts a two-dimensional block of transform coefficients to a one-dimensional coefficient array. From the perspective of video decoder 30, however, the scanning would convert a one-dimensional coefficient array into a two-dimensional transform coefficient block. As one example, the initial scan order of the corresponding prediction mode may be a zig-zag scan order. Zig-zag scanning is not the only possible initial scan order. Horizontal scanning, vertical scanning, or any other initial scanning order may be used as the initial scan order.

Coefficient scanning unit 55 collects statistics for one or more blocks (214). In particular, for each of the blocks that are scanned, coefficient scanning unit 55 may collect statistics that track, e.g., with counters, the frequency at which each of the coefficient positions within the two-dimensional block is a non-zero coefficient. Coefficient scanning unit 55 determines whether to evaluate the scan order (216). Coefficient scanning unit 55 may evaluate the scan order at fixed (e.g., at every block boundary or after n block boundaries) or non-fixed intervals (e.g., when one of the count values of a position within the block exceeds a threshold).

If coefficient scanning unit 55 determines not to evaluate the scan order, coefficient scanning unit 55 scans a subsequent block according to the initial scan order (212). If coefficient scanning unit 55 determines to evaluate the scan order, e.g., after n blocks have been encoded/decoded, coefficient scanning unit may adapt the scan order based on the collected statistics (218). For example, coefficient scanning unit 55 may adapt the scan order to scan the coefficient positions of the block in descending order based on their count values, where the count values reflect the likelihood of a given position having a non-zero coefficient. After adapting the scan order, coefficient scanning unit 55 may, in some instances, determine whether any count values of the statistics exceed a threshold value (220). If one of the coefficient positions has a corresponding count value that exceeds the threshold, coefficient scanning unit 55 may normalize the collected statistics, e.g., the coefficient count values (222). For example, coefficient scanning unit 55 may normalize the coefficient count values by reducing each of the count values by a pre-determined factor, e.g., by a factor of two to reduce each of the count values by one-half or resetting the count values to a set of initial count values. Normalizing the coefficient count values may allow video encoder 20 to adapt more quickly to local coefficient statistics.

After normalizing the collected statistics or when no normalization is performed, coefficient scanning unit 55 scans subsequent blocks using the adapted scan order (224). Coefficient scanning unit 55 may scan at least one subsequent block using the adapted scan order when the at least one subsequent block exists within a coding unit of the previously scanned video block. Coefficient scanning unit 55 may continue to scan subsequent video blocks until the scan order is adjusted again or re-initialized, e.g., at a coding unit boundary. In this manner, coefficient scanning unit 55 adapts the scan order based on the collected statistics to scan coefficient positions of the block that are determined to have a higher likelihood of being non-zero before coefficient positions of the block that are determined to have a smaller likelihood of being non-zero. Thus, the one-dimensional coefficient array is arranged to promote grouping of non-zero coefficients near the beginning of a scanned one-dimensional array and zero value coefficients near the end of the scanned one-dimensional array. This, in turn, can improve the level of compression that can be achieved during entropy coding.

In some instances, coefficient scanning unit 55 may adaptively adjust the scan order separately for each of the prediction modes since each of the prediction modes may have different coefficient statistics. In other words, coefficient scanning unit 55 may maintain separate statistics for each of the prediction modes and adjust the scan orders for each of the prediction modes differently based on the respective statistics. Thus, the example flow chart described above may be performed by coefficient scanning unit 55 for each prediction mode.

Figure 8:
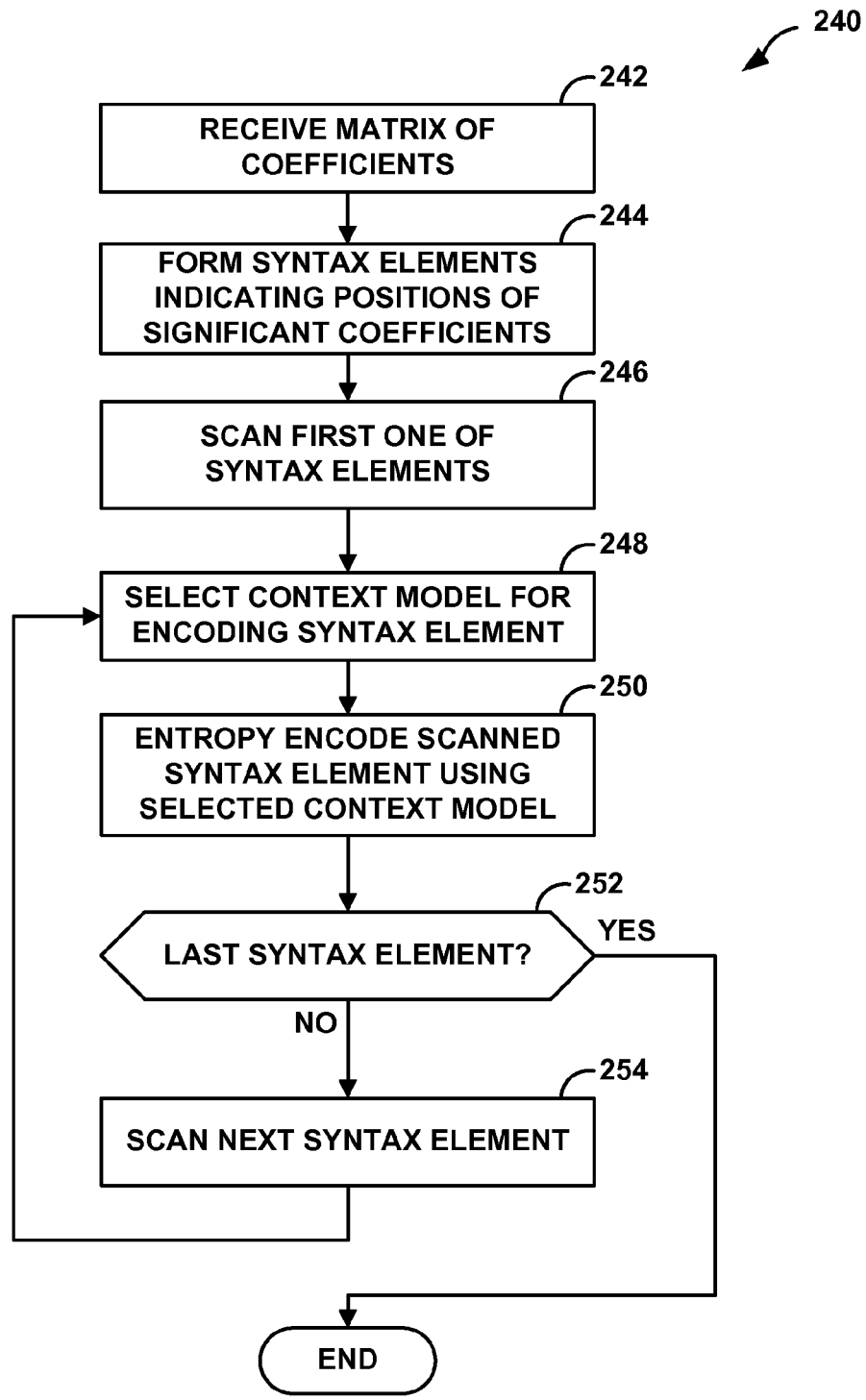
FIG. 8 is a flowchart illustrating an example method for selecting a context model to use when scanning and entropy encoding syntax elements that describe adaptively scanned coefficients.

FIG. 8 is a flowchart illustrating an example method 240 for selecting a context model to use when scanning and entropy encoding syntax elements that describe adaptively scanned coefficients. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 8.

It should also be understood that in other examples, similar methods may include additional or alternative steps to those illustrated in FIG. 8, or may perform the illustrated steps in a different order, without departing from the described techniques. Techniques for selecting a context model to use when scanning and entropy encoding syntax elements that describe adaptively scanned coefficients as illustrated in FIG. 8 may correspond to steps 150-154 of FIG. 5, or steps 190-194 of FIG. 6. That is, the method 240 shown in FIG. 8 may be performed when a scan order is selected and signaled. The techniques of FIG. 8 may be performed prior to, during, or after the adaptive scan of FIG. 7 is performed.

Entropy coding unit 56 may receive a matrix of quantized transform coefficients (242), e.g., from quantization unit 54. In general, using the example method of FIG. 8, entropy coding unit 56 may encode syntax elements that describe the received coefficients. The syntax elements may include, for each coefficient, a significant coefficient flag and a last coefficient flag. The significant coefficient flag may indicate whether the corresponding coefficient is significant, e.g., whether the value of the corresponding coefficient is greater than zero. The last coefficient flag may indicate whether the corresponding coefficient is the last coefficient of an adaptive scan.

Entropy coding unit 56 may determine positions of significant coefficients in the received matrix. Entropy coding unit 56 may form syntax elements indicating positions of significant coefficients in the received matrix (244). For example, for each coefficient in the matrix, entropy coding unit 56 may determine whether the coefficient is greater than zero, and if so, set a value in a syntax element matrix collocated with the coefficient equal to one, otherwise, entropy coding unit may set the value collocated with the coefficient equal to zero.

Entropy coding unit 56 may then scan a first one of the syntax elements in the syntax element matrix (246). Entropy coding unit 56 may apply a zig-zag scan, such as that shown in FIG. 4, or a scan selected based on a block type (inter- or intra-predicted block), a spatial prediction direction if the block is an intra-prediction encoded block, and/or a type of transform used. Next, entropy coding unit 56 may select a context model for encoding the scanned syntax element (248). In general, the context model may be selected based on the number of significant (e.g., non-zero) coefficients in the previously scanned N coefficients, where N is a non-zero integer value. N may be selected based on the size of the block. The context model may also be selected based on coding information of the CU currently being encoded or context information of neighboring CUs (e.g., prediction mode/direction, prediction unit size, a number of non-zero coefficients, and the like).

After selecting the context model to use to encode the current syntax element, entropy coding unit 56 may entropy encode the scanned syntax element using the selected context model (250). Entropy coding unit 56 may then determine whether the encoded syntax element is the last syntax element to be encoded (252). If the syntax element is the last syntax element ("YES" branch of 252), entropy coding unit 56 may stop scanning coefficients. On the other hand, if the syntax element is not the last syntax element ("NO" branch of 252), entropy coding unit 56 may scan the next syntax element (254), and again select a context model for encoding the scanned syntax element.

The example of FIG. 8 is primary discussed with respect to syntax elements describing whether particular coefficients are significant or not. These syntax elements may include, for example, significant coefficient flags, e.g., one-bit flags indicative of whether corresponding coefficients are significant, e.g., non-zero. It should be understood that similar techniques may be applied with respect to syntax elements describing whether a particular coefficient is the last coefficient in the adaptive scan. For example, similar techniques may be applied to a last coefficient flag. When encoding last coefficient flags using CABAC, the context model may be based on the order index in the adaptive scan that is based on block type, spatial prediction direction, and/or a selected transform.

Figure 9:
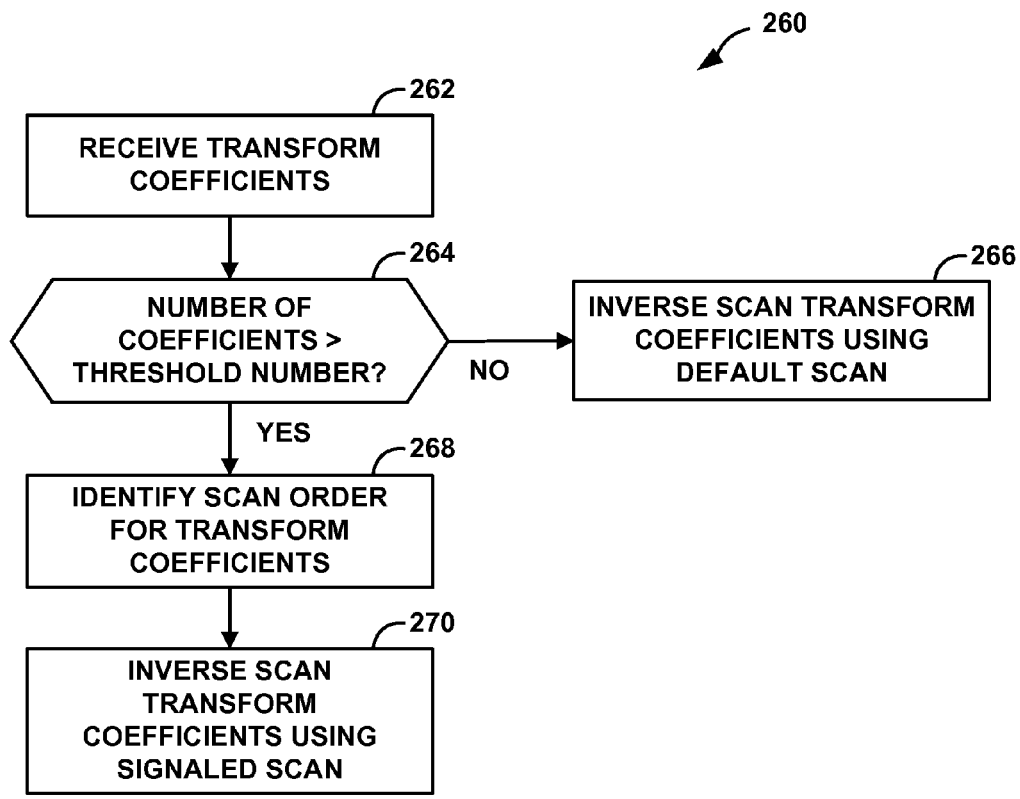
FIG. 9 is a flowchart illustrating an example method for determining whether to identify a scan order for inverse scanning transform coefficients, according to aspects of this disclosure.

FIG. 9 is a flowchart illustrating an example method 260 for determining whether to identify a scan order for received transform coefficients, according to aspects of this disclosure. In the example shown in FIG. 9, the method generally includes determining whether to identify a signaled scan order for transform coefficients associated with a TU based on the size of the TU being decoded. Although generally described as performed by components of video decoder 30 (FIG. 3) for purposes of explanation, it should be understood that other video encoding units, such as processors, processing units, hardware-based coding units such as encoder/decoders (CODECs), and the like, may also be configured to perform the method of FIG. 9.

The example method 260 shown in FIG. 9 begins with receiving transform coefficients (262). For example, a component of video decoder 30, such as entropy decoding unit 70, may receive a bitstream that contains encoded video data, as well as one or more syntax elements that assist in decoding the encoded video data. At least a portion of the received bitstream, according to the example shown in FIG. 9, includes a number of serialized quantized transform coefficients associated with a transform unit (TU). That is, entropy decoding unit 70 may receive a number of significant transform coefficients. Moreover, entropy decoding unit 70 may receive a significance map that indicates the relative locations for the significant coefficients within the TU. Entropy decoding unit 70 may utilize such information to reconstruct a two-dimensional block of transform coefficients from the received one dimensional array.

Upon receiving the transform coefficients, entropy decoding unit 70 may determine whether the number of received transform coefficients exceeds a predetermined threshold value (264). In the example shown in FIG. 9, entropy decoding unit 70 may determine whether the number of received transform coefficients exceeds the predetermined threshold based on a size of the TU being decoded. That is, entropy decoding unit 70 may receive an indication, such as a syntax element, that identifies the size of the received TU. In another example, entropy decoding unit 70 may determine the size of the received TU based on the number of received transform coefficients and/or significance map described above.

According to some aspects of this disclosure, entropy decoding unit 70 may determine whether the size of the received TU exceeds a predetermined threshold of 8×8 transform coefficients, although other thresholds may be used (e.g., 4×4, 16×16, and the like). If the size of the received TU is less than or equal to the threshold matrix size, entropy decoding unit 70 may inverse scan the received transform coefficients using a default scan order (266). That is, entropy decoding unit 70 may use a predefined scan order to reconstruct a two-dimensional TU that mirrors the default scan order that was used by a video encoder (e.g., video encoder 20) to serialize the TU. In an example, entropy decoding unit 70 may use an inverse of a zig-zag scan order applied by the video encoder.

If the size of the received TU exceeds the predetermined threshold, however, entropy decoding unit 70 may identify a scan order for scanning the transform coefficients (268). According to aspects of this disclosure, entropy decoding unit 70 may identify a scan order based on one or more syntax elements included in the bitstream. For example, video decoder 30 may identify a scan order that is explicitly indicated in the received bitstream. That is, video decoder 30 may identify one or more syntax elements in the bitstream that defines the scan order.

Additionally or alternatively, video decoder 30 may identify an adaptive scan order. That is, video decoder 30 may receive a syntax element or other indication that prompts video decoder 30 to perform an adaptive scan that mirrors an adaptive scan implemented by the video encoder that generated the received bitstream. In another example, video decoder 30 may identify a particular scan order based on an index value. That is, video decoder 30 may identify an index value in the bitstream that is associated with a particular scan order in a predefined table of scan orders (e.g., a look-up table of scan orders). In this example, video decoder 30 may include a table of scan orders that is the same as the table implemented by a video encoder, such as video encoder 20, that generated the bitstream.

According to aspects of this disclosure, as described in greater detail with respect to FIG. 8 above, the scan order may be signaled in the bitstream using a context model. Accordingly, entropy decoding unit 70 may identify the scan order using context based variable length code (VLC) tables and/or arithmetic coding methods that rely on context information from coding information of the CU currently being encoded or neighboring CUs (e.g., prediction mode/direction, prediction unit size, a number of non-zero coefficients, and the like).

Entropy decoding unit 70 may then inverse scan the transform coefficients using the identified scan order (270). That is, entropy decoding unit 70 may use the signaled scan order to reconstruct a two-dimensional TU from the received one-dimensional array of transform coefficients. It should also be understood that the steps shown and described with respect to FIG. 9 are provided as merely one example. For example, the steps of the method of FIG. 9 need not necessarily be performed in the order shown in FIG. 9, and fewer, additional, or alternative steps may be performed. Moreover, while certain aspects of FIG. 9 are generally described as being carried out by entropy decoding unit 70 of video decoder 30, it should be understood that a variety of other units or modules may be configured to carry out such aspects, such as inverse quantization unit 76.

Figure 10:
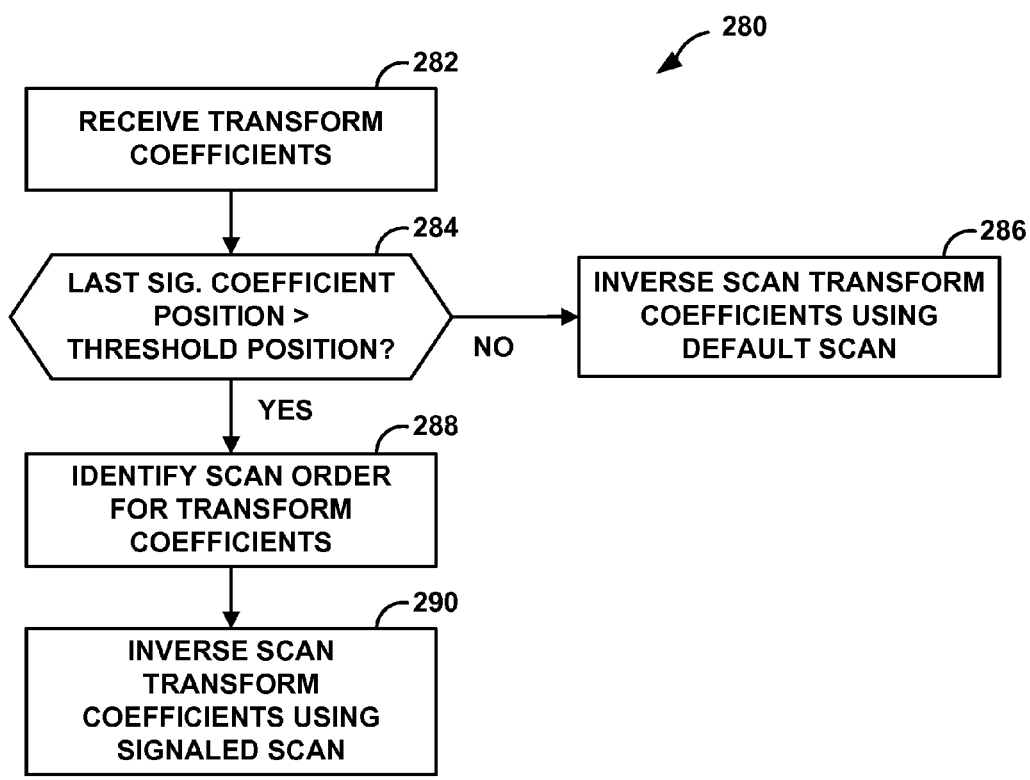
FIG. 10 is a flowchart illustrating another example method for determining whether to identify a scan order for inverse scanning transform coefficients, according to aspects of this disclosure.

FIG. 10 is a flowchart illustrating an example method 280 for determining whether to identify a scan order for received transform coefficients, according to aspects of this disclosure. In the example shown in FIG. 10, the method generally includes determining whether to identify a signaled scan order for transform coefficients associated with a TU based on a relative position of a last significant coefficient of the TU being decoded. Although generally described as performed by components of video decoder 30 (FIG. 3) for purposes of explanation, it should be understood that other video encoding units, such as processors, processing units, hardware-based coding units such as encoder/decoders (CODECs), and the like, may also be configured to perform the method of FIG. 10.

The example method 280 shown in FIG. 10 begins with receiving transform coefficients (282). For example, a component of video decoder 30, such as entropy decoding unit 70, may receive a bitstream that contains encoded video data, as well as one or more syntax elements that assist in decoding the encoded video data. At least a portion of the received bitstream, according to the example shown in FIG. 10, includes a number of serialized quantized transform coefficients associated with a transform unit (TU). That is, entropy decoding unit 70 may receive a number of significant transform coefficients. Moreover, entropy decoding unit 70 may receive a significance map that indicates the relative locations for the significant coefficients within the TU. Entropy decoding unit 70 may also receive a last significant coefficient flag that identifies the relative position of a last significant transform coefficient of the TU. Entropy decoding unit 70 may utilize such information to reconstruct a two-dimensional block of transform coefficients from the received one dimensional array.

Upon receiving the transform coefficients, entropy decoding unit 70 may determine whether the position of the last significant coefficient exceeds a predetermined threshold position (284). In the example shown in FIG. 10, entropy decoding unit 70 may identify the relative position based on a last significant coefficient flag and/or other significance information such as a significance map. If the position of the last significant coefficient is less than or equal to the threshold position, entropy decoding unit 70 may inverse scan the received transform coefficients using a default scan order (286). That is, entropy decoding unit 70 may use a predefined scan order to reconstruct a two-dimensional TU that mirrors the default scan order that was used by a video encoder (e.g., video encoder 20) to serialize the TU. In an example, entropy decoding unit 70 may use an inverse of a zig-zag scan order applied by the video encoder.

If the size of the position of the last significant transform coefficient exceeds the predetermined threshold, however, entropy decoding unit 70 may identify a scan order for scanning the transform coefficients (288). According to aspects of this disclosure, entropy decoding unit 70 may identify a scan order based on one or more syntax elements included in the bitstream. For example, video decoder 30 may identify a scan order that is explicitly indicated in the received bitstream. That is, video decoder 30 may identify one or more syntax elements in the bitstream that defines the scan order.

Additionally or alternatively, video decoder 30 may identify an adaptive scan order. That is, video decoder 30 may receive a syntax element or other indication that prompts video decoder 30 to perform an adaptive scan that mirrors an adaptive scan implemented by the video encoder that generated the received bitstream. In another example, video decoder 30 may identify a particular scan order based on an index value. That is, video decoder 30 may identify an index value in the bitstream that is associated with a particular scan order in a predefined table of scan orders (e.g., a look-up table of scan orders). In this example, video decoder 30 may include a table of scan orders that is the same as the table implemented by a video encoder, such as video encoder 20 that generated the bitstream.

According to aspects of this disclosure, as described in greater detail with respect to FIG. 8 above, the scan order may be signaled in the bitstream using a context model. Accordingly, entropy decoding unit 70 may identify the scan order using context based variable length code (VLC) tables and/or arithmetic coding methods that rely on context information from coding information of the CU currently being encoded or neighboring CUs (e.g., prediction mode/direction, prediction unit size, a number of non-zero coefficients, and the like).

Entropy decoding unit 70 may then inverse scan the transform coefficients using the identified scan order (290). That is, entropy decoding unit 70 may use the signaled scan order to reconstruct a two-dimensional TU from the received one-dimensional array of transform coefficients. It should also be understood that the steps shown and described with respect to FIG. 10 are provided as merely one example. For example, the steps of the method of FIG. 10 need not necessarily be performed in the order shown in FIG. 10, and fewer, additional, or alternative steps may be performed. Moreover, while certain aspects of FIG. 10 are generally described as being carried out by entropy decoding unit 70 of video decoder 30, it should be understood that a variety of other units or modules may be configured to carry out such aspects, such as inverse quantization unit 76.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for decoding video data, the method comprising:
   receiving a serialized one-dimensional array of transform coefficients associated with a block of video data;
   determining a number of transform coefficients that are included in the serialized one-dimensional array and associated with the block of video data, wherein the number of transform coefficients is a quantity of the transform coefficients that are included in the serialized one-dimensional array;
   comparing the number of transform coefficients to a predetermined threshold number of transform coefficients;
   decoding, based on the number of transform coefficients exceeding the predetermined threshold number, at least one syntax element, separate from the transform coefficients, that indicates a scan order from a plurality of scan orders, wherein the scan order indicates an order in which the transform coefficients have been serialized from a two-dimensional array to the serialized one-dimensional array;
   determining the scan order based on the at least one syntax element; and
   inverse scanning the serialized one-dimensional array of transform coefficients to reconstruct the two-dimensional array of transform coefficients according to the determined scan order.

2. The method of claim 1, further comprising:
   receiving a second serialized one-dimensional array of transform coefficients associated with a second block of video data;
   determining a second number of transform coefficients that are included in the second serialized one-dimensional array and associated with the second block of video data;
   comparing the second number of transform coefficients to the predetermined threshold number of transform coefficients;
   based on the second number being less than the predetermined threshold number, determining a default scan order for scanning the second serialized one-dimensional array; and
   inverse scanning the second serialized one-dimensional array of transform coefficients with the default scan order.

3. The method of claim 1, wherein the at least one syntax element comprises an index value that identifies the scan order in a predefined table of scan orders.

4. The method of claim 1, wherein the transform coefficients are non-zero transform coefficients and the predetermined threshold is a predetermined number of non-zero transform coefficients.

5. The method of claim 1, wherein determining the number of transform coefficients comprises determining the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

6. The method of claim 1, further comprising determining whether a bitstream that includes the block of video data includes the at least one syntax element.

7. The method of claim 1, further comprising decoding the at least one syntax element using a context model that is selected based on information associated with neighboring blocks of the block of video data.

8. An apparatus for decoding video data, the apparatus comprising:
   a memory configured to store a block of video data; and
   a video decoder configured to:
      receiving a serialized one-dimensional array of transform coefficients associated with a block of video data;
      determine a number of transform coefficients that are included in the serialized one-dimensional array and associated with the block of video data, wherein the number of transform coefficients is a quantity of the transform coefficients that are included in the serialized one-dimensional array;
      compare the number of transform coefficients to a predetermined threshold number of transform coefficients;
      decode, based on the number of transform coefficients exceeding the predetermined threshold number, at least one syntax element, separate from the transform coefficients, that indicates a scan order from a plurality of scan orders, wherein the scan order indicates an order in which the transform coefficients have been serialized from a two-dimensional array to the serialized one-dimensional array;
      determine the scan order based on the at least one syntax element; and
      inverse scan the serialized one-dimensional array of transform coefficients to reconstruct the two-dimensional array of transform coefficients according to the determined scan order.

9. The apparatus of claim 8, wherein the video decoder is further configured to:
   receive a second serialized one-dimensional array of transform coefficients associated with a second block of video data;
   determine a second number of transform coefficients that are included in the second serialized one-dimensional array and associated with the second block of video data compare the second number of transform coefficients to the predetermined threshold number of transform coefficients;

based on the second number being less than the predetermined threshold number, determine a default scan order for scanning the second serialized one-dimensional array; and inverse scan the second serialized one-dimensional array of transform coefficients with the default scan order.

10. The apparatus of claim 8, wherein the at least one syntax element comprises an index value that identifies the scan order in a predefined table of scan orders.

11. The apparatus of claim 8, wherein the transform coefficients are non-zero transform coefficients and the predetermined threshold is a predetermined number of non-zero transform coefficients.

12. The apparatus of claim 8, wherein to determine the number of transform coefficients, the video decoder is configured to determine the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

13. The apparatus of claim 8, wherein the video decoder is further configured to determine whether a bitstream that includes the block of video data includes the at least one syntax element.

14. The apparatus of claim 13, wherein the video decoder is further configured to decode the at least one syntax element using a context model that is selected based on information associated with neighboring blocks of the block of video data.

15. An apparatus for decoding video data, the apparatus comprising:
means for receiving a serialized one-dimensional array of transform coefficients associated with a block of video data;
determining a number of transform coefficients that are included in the serialized one-dimensional array and associated with the block of video data, wherein the number of transform coefficients is a quantity of the transform coefficients that are included in the serialized one-dimensional array;
comparing the number of transform coefficients to a predetermined threshold number of transform coefficients;
means for decoding, based on the number of transform coefficients exceeding the predetermined threshold number, at least one syntax element, separate from the transform coefficients, that indicates a scan order from a plurality of scan orders, wherein the scan order indicates an order in which the transform coefficients have been serialized from a two-dimensional array to the serialized one-dimensional array;
means for determining the scan order based on the at least one syntax element; and
means for inverse scanning the serialized one-dimensional array of transform coefficients to reconstruct the two-dimensional array of transform coefficients according to the determined scan order.

16. The apparatus of claim 15, further comprising:
means for receiving a second serialized one-dimensional array of transform coefficients associated with a second block of video data;
means for determining a second number of transform coefficients that are included in the second serialized one-dimensional array and associated with the second block of video data means for comparing the second number of transform coefficients to the predetermined threshold number of transform coefficients;
means for determining, based on the second number being less than the predetermined threshold number, a default scan order for scanning the second serialized one-dimensional array; and
means for inverse scanning the second serialized one-dimensional array of transform coefficients with the default scan order.

17. The apparatus of claim 15, wherein the at least one syntax element comprises an index value that identifies the scan order in a predefined table of scan orders.

18. The apparatus of claim 15, wherein the transform coefficients are non-zero transform coefficients and the predetermined threshold is a predetermined number of non-zero transform coefficients.

19. The apparatus of claim 15, wherein the means for determining the number of transform coefficients comprises means for determining the number of transform coefficients based on a last significant coefficient flag of a transform unit (TU) associated with the block of video data; a number of significant transform coefficients associated with the TU; a relative position of the last significant transform coefficient associated with the TU; and a significance map associated with the TU.

20. A non-transitory computer-readable storage medium having stored thereon instructions that, when executed, cause a processor of a device for decoding video data to:
receive a serialized one-dimensional array of transform coefficients associated with a block of video data;
determine a number of transform coefficients that are included in the serialized one-dimensional array and associated with the block of video data, wherein the number of transform coefficients is a quantity of the transform coefficients that are included in the serialized one-dimensional array;
compare the number of transform coefficients to a predetermined threshold number of transform coefficients;
decode, based on the number of transform coefficients exceeding the predetermined threshold number, at least one syntax element, separate from the transform coefficients, that indicates a scan order from a plurality of scan orders, wherein the scan order indicates an order in which the transform coefficients have been serialized from a two-dimensional array to the serialized one-dimensional array;
determine the scan order based on the at least one syntax element; and
inverse scan the serialized one-dimensional array of transform coefficients to reconstruct the two-dimensional array of transform coefficients according to the determined scan order.

21. The non-transitory computer-readable medium of claim 20, further comprising instructions that, when executed, cause the processor to:
receive a second serialized one-dimensional array of transform coefficients associated with a second block of video data;
determine a second number of transform coefficients that are included in the second serialized one-dimensional array and associated with the second block of video data;
compare the second number of transform coefficients to the predetermined threshold number of transform coefficients;

based on the second number being less than the predetermined threshold number, determine a default scan order for scanning the second serialized one-dimensional array; and inverse scan the second serialized one-dimensional array of transform coefficients with the default scan order.

22. The non-transitory computer-readable medium of claim 20, wherein the at least one syntax element comprises an index value that identifies the scan order in a predefined table of scan orders.

23. The non-transitory computer-readable medium of claim 20, wherein the transform coefficients are non-zero transform coefficients and the predetermined threshold is a predetermined number of non-zero transform coefficients.

24. The non-transitory computer-readable medium of claim 20, wherein to determine the number of transform coefficients, the instructions cause the processor to determine the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

25. A method for encoding video data, the method comprising:
determining a number of transform coefficients associated with a block of video data, wherein the number of transform coefficients is a quantity of the transform coefficients that are included in the serialized one-dimensional array;
comparing the number of transform coefficients to a predetermined threshold number of transform coefficients;
determining, based on the number of transform coefficients exceeding the predetermined threshold number, to encode at least one syntax element, separate from the transform coefficients that indicates a scan order from a plurality of scan orders and determining not to encode the at least one syntax element based on the number of transform coefficients being less than that predetermined threshold number, wherein the scan order indicates an order in which the transform coefficients are serialized from a two-dimensional array to a one-dimensional array;
determining the scan order and scanning the transform coefficients according to the determined scan order; and
encoding the at least one syntax element and the transform coefficients.

26. The method of claim 25, further comprising
determining a second number of transform coefficients associated with a second block of video data;
comparing the second number of transform coefficients to the predetermined threshold number of transform coefficients;
based on the second number being less than the predetermined threshold number, determining a default scan order for scanning the second serialized one-dimensional array; and
scanning the transform coefficients associated with the second block of video data according to the default scan order.

27. The method of claim 25, wherein the at least one syntax element comprises an index value that identifies the scan order in a predefined table of scan orders.

28. The method of claim 25, wherein determining the number of the transform coefficients comprises determining a size of the block of video data, and wherein comparing the number of the transform coefficients to the predetermined threshold comprises comparing the size of the block of video data to is a predetermined matrix size threshold.

29. The method of claim 28, wherein the predetermined matrix size threshold is an 8×8 matrix.

30. The method of claim 25, wherein the transform coefficients are non-zero transform coefficients and the predetermined threshold is a predetermined number of non-zero transform coefficients.

31. The method of claim 25, wherein determining the number of transform coefficients comprises determining the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

32. The method of claim 25, wherein signaling the scan order comprises entropy encoding the at least one syntax element using a context model that is selected based on information associated with neighboring blocks of the block of video data.

33. An apparatus for encoding video data, the apparatus comprising:
a memory configured to store a block of video data; and
a video encoder configured to:
determine a number of transform coefficients associated with a block of video data, wherein the number of transform coefficients is a quantity of the transform coefficients that are included in the serialized one-dimensional array;
compare the number of transform coefficients to a predetermined threshold number of transform coefficients;
determine, based on the number of transform coefficients exceeding the predetermined threshold number, to encode at least one syntax element, separate from the transform coefficients that indicates a scan order from a plurality of scan orders and determining not to encode the at least one syntax element based on the number of transform coefficients being less than that predetermined threshold number, wherein the scan order indicates an order in which the transform coefficients are serialized from a two-dimensional array to a one-dimensional array;
determine the scan order and scan the transform coefficients according to the determined scan order; and
encode the at least one syntax element and the transform coefficients in a bitstream.

34. The apparatus of claim 33, wherein the video encoder is further configured to:
determine a second number of transform coefficients associated with a second block of video data;
compare the second number of transform coefficients to the predetermined threshold number of transform coefficients;
based on the second number being less than the predetermined threshold number, determine a default scan order for scanning the second serialized one-dimensional array; and
scan the transform coefficients associated with the second block of video data according to the default scan order.

35. The apparatus of claim 34, wherein the at least one syntax element comprises an index value that identifies the scan order in a predefined table of scan orders.

36. The apparatus of claim 33, wherein to determine the number of the transform coefficients, the video encoder is configured to determine a size of the block of video data, and wherein to compare the number of the transform coefficients to the predetermined threshold, the video encoder is configured to compare the size of the block of video data to is a predetermined matrix size threshold.

37. The apparatus of claim 36, wherein the predetermined matrix size threshold is an 8×8 matrix.

38. The apparatus of claim 33, wherein the transform coefficients are non-zero transform coefficients and the predetermined threshold is a predetermined number of non-zero transform coefficients.

39. The apparatus of claim 33, wherein to determine the number of transform coefficients, the video encoder is configured to determine the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

40. The apparatus of claim 33, wherein to signal the scan order the video encoder is configured to entropy encode the at least one syntax element using a context model that is selected based on information associated with neighboring blocks of the block of video data.

41. An apparatus for encoding video data, the apparatus comprising:
  means for determining a number of transform coefficients associated with a block of video data, wherein the number of transform coefficients is a quantity of the transform coefficients that are included in the serialized one-dimensional array;
  means for comparing the number of transform coefficients to a predetermined threshold number of transform coefficients;
  means for determining, based on the number of transform coefficients exceeding the predetermined threshold number, to encode at least one syntax element, separate from the transform coefficients that indicates a scan order from a plurality of scan orders and determining not to encode the at least one syntax element based on the number of transform coefficients being less than that predetermined threshold number, wherein the scan order indicates an order in which the transform coefficients are serialized from a two-dimensional array to a one-dimensional array;
  means for determining the scan order and scanning the transform coefficients according to the determined scan order; and
  means for encoding the at least one syntax element and the transform coefficients.

42. The apparatus of claim 41, further comprising:
  means for determining a second number of transform coefficients associated with a second block of video data;
  means for comparing the second number of transform coefficients to the predetermined threshold number of transform coefficients;
  means for determining, based on the second number being less than the predetermined threshold number, a default scan order for scanning the second serialized one-dimensional array; and
  means for scanning the transform coefficients associated with the second block of video data according to the default scan order.

43. The apparatus of claim 41, wherein the at least one syntax element comprises an index value that identifies the scan order in a predefined table of scan orders.

44. The apparatus of claim 41, wherein the means for determining the number of the transform coefficients comprises means for determining a size of the block of video data, and wherein the means for comparing the number of the transform coefficients to the predetermined threshold comprises mean for comparing the size of the block of video data to is a predetermined matrix size threshold.

45. The apparatus of claim 44, wherein the predetermined matrix size threshold is an 8×8 matrix.

46. The apparatus of claim 41, wherein the transform coefficients are non-zero transform coefficients and the predetermined threshold is a predetermined number of non-zero transform coefficients.

47. The apparatus of claim 41, wherein the means for determining the number of transform coefficients comprises means for determining the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

48. A non-transitory computer-readable storage medium having stored thereon instructions that, when executed, cause a processor of a device for encoding video data to:
  determine a number of transform coefficients associated with a block of video data wherein the number of transform coefficients is a quantity of the transform coefficients that are included in the serialized one-dimensional array;
  compare the number of transform coefficients to a predetermined threshold number of transform coefficients;
  determine, based on the number of transform coefficients exceeding the predetermined threshold number, to encode at least one syntax element, separate from the transform coefficients that indicates a scan order from a plurality of scan orders and determining not to encode the at least one syntax element based on the number of transform coefficients being less than that predetermined threshold number, wherein the scan order indicates an order in which the transform coefficients are serialized from a two-dimensional array to a one-dimensional array;
  determine the scan order and scanning the transform coefficients according to the determined scan order; and
  encode the at least one syntax element and the transform coefficients.

49. The non-transitory computer-readable medium of claim 48, wherein the instructions further cause the processor to:
  determine a second number of transform coefficients associated with a second block of video data;
  compare the second number of transform coefficients to the predetermined threshold number of transform coefficients;
  based on the second number being less than the predetermined threshold number, determine a default scan order for scanning the second serialized one-dimensional array; and
  scan the transform coefficients associated with the second block of video data according to the default scan order.

50. The non-transitory computer-readable medium of claim 48, wherein the at least one syntax element comprises an index value that identifies the scan order in a predefined table of scan orders.

51. The non-transitory computer-readable medium of claim 48, wherein to determine the number of the transform coefficients, the instructions cause the processor to determine a size of the block of video data, and wherein to compare the number of the transform coefficients to the predetermined threshold, the instructions cause the processor to compare the size of the block of video data to is a predetermined matrix size threshold.

52. The non-transitory computer-readable medium of claim 51, wherein the predetermined matrix size threshold is an 8×8 matrix.

53. The non-transitory computer-readable medium of claim 48, wherein the transform coefficients are non-zero transform coefficients and the predetermined threshold is a predetermined number of non-zero transform coefficients.

54. The non-transitory computer-readable medium of claim 48, wherein to determine the number of transform coefficients, the instructions cause the video encoder to determine the number of transform coefficients based on a last significant coefficient flag of a transform unit (TU) associated with the block of video data, a number of significant transform coefficients associated with the TU, a relative position of the last significant transform coefficient associated with the TU, or a significance map associated with the TU.

55. The method of claim 1, the method being executable on a wireless communication device, wherein the device comprises:
  a receiver configured to receive the serialized one-dimensional array of transform coefficients associated with the block of video data;
  a memory configured to store the serialized one-dimensional array of transform coefficients associated with the block of video data; and
  a processor configured to execute instructions to process the serialized one-dimensional array of transform coefficients stored to the memory.

56. The method of claim 55, wherein the wireless communication device is a cellular telephone and the serialized one-dimensional array of transform coefficients are received by the receiver and modulated according to a cellular communication standard.

57. The apparatus of claim 8, wherein the device is a wireless communication device, further comprising a receiver configured to receive the serialized one-dimensional array of transform coefficients associated with the block of video data.

58. The device of claim 57, wherein the wireless communication device is a cellular telephone and the serialized one-dimensional array of transform coefficients are received by the receiver and modulated according to a cellular communication standard.

* * * * *